US012608894B2

(12) United States Patent
Gustin et al.

(10) Patent No.: US 12,608,894 B2
(45) Date of Patent: *Apr. 21, 2026

(54) DIGITAL IMAGING ANALYSIS OF BIOLOGICAL FEATURES DETECTED IN PHYSICAL MEDIUMS

(71) Applicant: The Procter & Gamble Company, Cincinnati, OH (US)

(72) Inventors: Jennifer Joan Gustin, Cincinnati, OH (US); Amirhossein Tavanaei, Mason, OH (US); Kelly Anderson, Cincinnati, OH (US); Donald C. Roe, Cincinnati, OH (US); Roland Engel, Cincinnati, OH (US); Latisha Salaam Zayid, Cincinnati, OH (US); Andrew Nicholas Carr, Maineville, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 111 days.

This patent is subject to a terminal disclaimer.

(21) Appl. No.: 18/610,810

(22) Filed: Mar. 20, 2024

(65) Prior Publication Data

US 2024/0257479 A1      Aug. 1, 2024

Related U.S. Application Data

(63) Continuation of application No. 17/835,008, filed on Jun. 8, 2022, now Pat. No. 11,967,031.
(Continued)

(51) Int. Cl.
*G06T 7/10* (2017.01)
*G06T 19/00* (2011.01)

(52) U.S. Cl.
CPC .............. *G06T 19/006* (2013.01); *G06T 7/10* (2017.01); *G06T 2207/30196* (2013.01)

(58) Field of Classification Search
CPC  G06T 19/006; G06T 7/10; G06T 2207/30196
(Continued)

(56) References Cited

U.S. PATENT DOCUMENTS 8,370,280 B1    2/2013  Lin
8,762,299 B1    6/2014  Breckenridge
(Continued)

OTHER PUBLICATIONS

All Office Actions; U.S. Appl. No. 17/835,008, filed Jun. 8, 2022.
(Continued)

*Primary Examiner* — Hai Tao Sun
(74) *Attorney, Agent, or Firm* — Daniel S. Albrecht

(57) ABSTRACT

Biological digital imaging systems and methods are disclosed for analyzing pixel data of one or more digital images depicting absorbent articles or portions thereof. A digital image comprising pixel data is obtained depicting an absorbent article or a portion of an absorbent article. An imaging application (app) analyzes the digital image to detect a biological feature depicted within the pixel data of the digital image of the absorbent article or the portion of the absorbent article. The imaging app generates an individual-specific biological prediction value corresponding to at least one of: (a) the absorbent article; (b) the portion of the absorbent article; or (c) an individual associated with the absorbent article or portion of the absorbent article. The individual-specific biological prediction value is based on the biological feature depicted within the pixel data of the digital image of the absorbent article or the portion of the absorbent article.

19 Claims, 9 Drawing Sheets

Related U.S. Application Data

(60) Provisional application No. 63/209,564, filed on Jun. 11, 2021.

(58) Field of Classification Search
USPC .......................................................... 345/632
See application file for complete search history.

(56) References Cited

U.S. PATENT DOCUMENTS

| | | |
|---|---|---|
| 10,438,212 B1 | 10/2019 | Jilani et al. |
| 10,643,154 B2 | 5/2020 | Litherland |
| 10,736,579 B2 | 8/2020 | Van Berkel-wijnen |
| 10,990,901 B2 | 4/2021 | Deo |
| 11,037,222 B1 | 6/2021 | Natesh et al. |
| 11,164,109 B2 | 11/2021 | Browne |
| 11,461,630 B1 | 10/2022 | Black et al. |
| 11,967,031 B2 | 4/2024 | Gustin |
| 2005/0256686 A1 | 11/2005 | Stabelfeldt et al. |
| 2012/0284212 A1 | 11/2012 | Lin |
| 2016/0063320 A1 | 3/2016 | Liu et al. |
| 2017/0075910 A1 | 3/2017 | Soto Matamala et al. |
| 2017/0345172 A1* | 11/2017 | Gustin ................... G06V 20/64 |
| 2018/0015379 A1 | 1/2018 | Pratt |
| 2018/0039731 A1 | 2/2018 | Szeto |
| 2018/0047071 A1 | 2/2018 | Hsu et al. |
| 2019/0060142 A1* | 2/2019 | Okuda ................... A61F 13/84 |
| 2019/0220738 A1 | 7/2019 | Flank |
| 2019/0258498 A1 | 8/2019 | Chandan et al. |
| 2020/0058137 A1 | 2/2020 | Pujades et al. |
| 2020/0170564 A1 | 6/2020 | Jiang et al. |
| 2020/0327549 A1 | 10/2020 | Zhou et al. |
| 2020/0394451 A1 | 12/2020 | Baijal et al. |
| 2021/0035185 A1 | 2/2021 | Lee et al. |
| 2021/0108938 A1 | 4/2021 | Williams |
| 2021/0233157 A1 | 7/2021 | Crutchfield, Jr. |
| 2021/0287141 A1 | 9/2021 | Molloy et al. |
| 2022/0191155 A1* | 6/2022 | Eidelman ................ G06F 40/40 |
| 2022/0292595 A1 | 9/2022 | Li et al. |
| 2022/0398055 A1 | 12/2022 | Gustin et al. |
| 2022/0415002 A1 | 12/2022 | Sauer et al. |

OTHER PUBLICATIONS

All Office Actions; U.S. Appl. No. 17/835,019, filed Jun. 8, 2022.
All Office Actions; U.S. Appl. No. 17/836,372, filed Jun. 9, 2022.

* cited by examiner

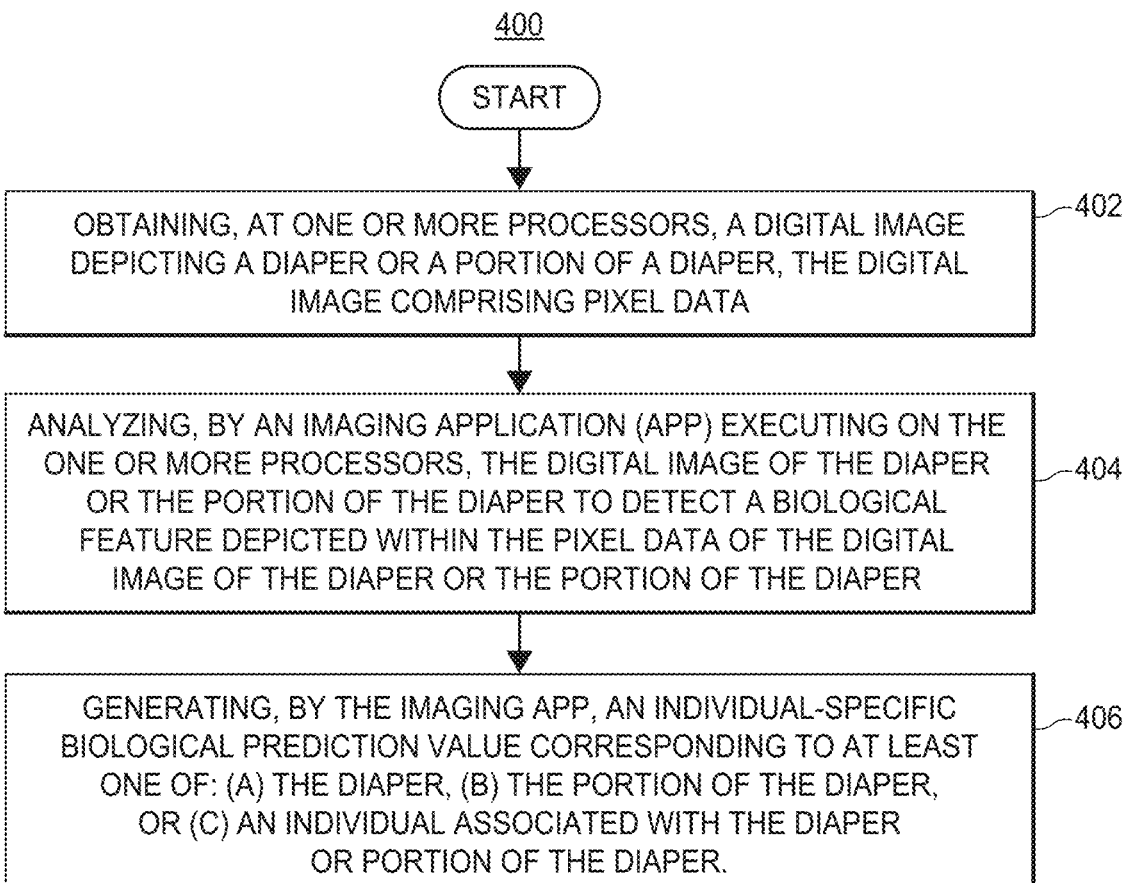

<u>400</u>

START

OBTAINING, AT ONE OR MORE PROCESSORS, A DIGITAL IMAGE DEPICTING A DIAPER OR A PORTION OF A DIAPER, THE DIGITAL IMAGE COMPRISING PIXEL DATA ⟋402

ANALYZING, BY AN IMAGING APPLICATION (APP) EXECUTING ON THE ONE OR MORE PROCESSORS, THE DIGITAL IMAGE OF THE DIAPER OR THE PORTION OF THE DIAPER TO DETECT A BIOLOGICAL FEATURE DEPICTED WITHIN THE PIXEL DATA OF THE DIGITAL IMAGE OF THE DIAPER OR THE PORTION OF THE DIAPER ⟋404

GENERATING, BY THE IMAGING APP, AN INDIVIDUAL-SPECIFIC BIOLOGICAL PREDICTION VALUE CORRESPONDING TO AT LEAST ONE OF: (A) THE DIAPER, (B) THE PORTION OF THE DIAPER, OR (C) AN INDIVIDUAL ASSOCIATED WITH THE DIAPER OR PORTION OF THE DIAPER. ⟋406

FIG. 4

DIGITAL IMAGING ANALYSIS OF BIOLOGICAL FEATURES DETECTED IN PHYSICAL MEDIUMS

CROSS REFERENCE TO RELATED APPLICATION

This application claims priority under 35 U.S.C. § 120 to and is a continuation of U.S. patent application Ser. No. 17/835,008, filed Jun. 8, 2022, which claims the benefit, under 35 U.S.C. § 119(e), of U.S. Provisional Application No. 63/209,564, filed Jun. 11, 2021, which is incorporated herein by reference in its entirety.

FIELD

The present disclosure generally relates to digital imaging systems and methods, and more particularly, to biological digital imaging systems and methods for analyzing pixel data of one or more digital images depicting absorbent articles or portions of absorbent articles.

BACKGROUND

Users of absorbent articles experience issues or concerns related to the use of the absorbent article, the substances the articles are designed to absorb, or their own health. For example, generally, new parents, or otherwise guardians or caretakers, experience a multitude of issues when learning to care for an infant or other individuals in need of care. One such issue includes managing biological waste, discharge, or excrement, which can include diaper sizing, changing, and other issues related to bowel movements (BM), urination, or other such digestive tract issues (e.g., such as dehydration, food allergies or intolerances, etc.) with a newborn child or other individual experiencing such issues. Thus, problems with infant or individual development, including health, safety, wellness, and/or sanitary situations or issues, can arise, including over time, where parents, or otherwise guardians, fail to recognize such problems specific to a given infant, child, or otherwise individual. Related problems can include biological waste issues, such as BM and/or urination leaks and related skin irritation, skin dryness, skin erythema, or health issues related to the GI tract, each of which can affect and be detrimental to the health of an infant or individual. In addition, a wrong size diaper can operate ineffectively, where such diaper, having an incorrect fit for a specific infant or individual, can cause discomfort and/or unhealthy development for the specific infant or individual.

Prior art methods for treating such issues, including manual instruction or manual sizing charts, can be time consuming or error prone (and possibly negative). In addition, a parent or caretaker, following such prior art methods, may attempt to empirically experiment with various products or techniques, but may fail to achieve satisfactory results or may cause possible negative side effects, impacting the health or safety of a specific infant or individual.

For the foregoing reasons, there is a need for biological digital imaging systems and methods for analyzing pixel data of one or more digital images depicting absorbent articles or portions of absorbent articles.

SUMMARY

Generally, as described herein, biological digital imaging systems and methods are described for analyzing pixel data of one or more digital images depicting absorbent articles or portions of absorbent articles and/or skin of a wearer. Such biological digital imaging systems and methods provide a digital imaging based, and in various aspects artificial intelligence (AI) based, solutions for overcoming problems that arise from the difficulties in identifying and treating various health or safety issues related to bowel movements (BM), urination, or other such digestive track issues of a specific infant or individual.

The biological digital imaging systems and methods, as described herein, allow a user to submit a specific image (e.g., of a digital image depicting an absorbent article or a portion of an absorbent article) to imaging server(s) (e.g., including its one or more processors), or a computing device (e.g., such as locally on the user's mobile device), where the imaging server(s) and/or user computing device, implements or executes an imaging application (app) for analyzing pixel data of image as described herein. For example, in various aspects, an artificial intelligence based biological based learning model is trained with pixel data of potentially $10,000s$ (or more) images depicting absorbent articles or portions of absorbent articles of respective individuals. The biological based learning model may generate or output, based on an image classification, prediction, or other determination of a biological feature depicted in a digital image of an absorbent article or the portion of the absorbent article as used by the individual, an individual-specific biological prediction value designed to address or identity the biological feature as detected within the pixel data of the image. For example, an image of an absorbent article or portion of the absorbent article, as submitted for an individual (e.g., an infant), can comprise pixels or pixel data indicative of a color, consistency, and/or an amount corresponding to that specific individual's BM, urine, or other biological waste identifiable within pixel data of a digital image.

In some aspects, the individual-specific biological prediction value may be transmitted via a computer network to a user computing device of a user for rendering on a display screen. In other aspects, no transmission to the imaging server of the individual's specific image occurs, where the individual-specific biological prediction value may instead be generated by the by the imaging application (app) and/or biological based learning model executing and/or implemented locally (at the "edge") on a user's mobile device and rendered, by a processor of the mobile device, on a display screen of the mobile device. In various aspects, such rendering may include graphical representations, overlays, annotations, virtual renderings, and the like, for addressing the biological feature in the pixel data. In various aspects, such individual-specific biological prediction value and related information, as provided or displayed, provide digital coaching or advising to parents or other caretakers regarding BM, stools, number of wet absorbent articles, and can provide a digital and electronic platform for treating, preventing, and/or mitigating BM leaks, skin irritation, skin dryness and/or skin health, including for example skin erythema, for infants or other individuals expiring such issues.

More specifically, as described herein, a biological digital imaging method is disclosed for analyzing pixel data of one or more digital images depicting absorbent articles or portions of absorbent articles and/or portions of a wearer's skin. The biological digital imaging method comprises obtaining, at one or more processors, a digital image depicting an absorbent article or a portion of an absorbent article and/or skin, the digital image comprising pixel data; analyzing, by an imaging application (app) executing on the one or more processors, the digital image of the absorbent article or the portion of the absorbent article to detect a biological feature depicted within the pixel data of the digital image of the absorbent article or the portion of the absorbent article; and generating, by the imaging app, an individual-specific biological prediction value corresponding to at least one of: (a) the absorbent article; (b) the portion of the absorbent article; or (c) an individual associated with the absorbent article or portion of the absorbent article. In various aspects, the individual-specific biological prediction value is based on the biological feature depicted within the pixel data of the digital image of the absorbent article or the portion of the absorbent article.

In addition, as described herein, a biological digital imaging system is disclosed. The biological digital imaging system is configured to analyze pixel data of one or more digital images depicting absorbent articles or portions of absorbent articles. The biological digital imaging system may include one or more processors and an imaging application (app) comprising computing instructions configured to execute on the one or more processors. The computing instructions of the imaging app, when executed by the one or more processors, may cause the one or more processors to obtain, at the one or more processors, a digital image comprising pixel data and depicting an absorbent article or a portion of an absorbent article. The computing instructions of the imaging app when executed by the one or more processors, may further cause the one or more processors to analyze, by the imaging application (app) executing on the one or more processors, the digital image of the absorbent article or the portion of the absorbent article to detect a biological feature depicted within the pixel data of the digital image of the absorbent article or the portion of the absorbent article. The computing instructions of the imaging app when executed by the one or more processors, may further cause the one or more processors to generate, by the imaging app, an individual-specific biological prediction value corresponding to at least one of: (a) the absorbent article; (b) the portion of the absorbent article; or (c) an individual associated with the absorbent article or portion of the absorbent article. In various aspects, the individual-specific biological prediction value is based on the biological feature depicted within the pixel data of the digital image of the absorbent article or the portion of the absorbent article.

Further, as described herein, a tangible, non-transitory computer-readable medium storing instructions for analyzing pixel data of one or more digital images depicting absorbent articles or portions of absorbent articles is disclosed. The instructions, when executed by one or more processors, may cause the one or more processors to obtain, at one or more processors, a digital image depicting an absorbent article or a portion of an absorbent article, the digital image comprising pixel data. The instructions, when executed by one or more processors, may further cause the one or more processors to analyze, by an imaging application (app) executing on the one or more processors, the digital image of the absorbent article or the portion of the absorbent article to detect a biological feature depicted within the pixel data of the digital image of the absorbent article or the portion of the absorbent article. The instructions, when executed by one or more processors, may further cause the one or more processors to generate, by the imaging app, an individual-specific biological prediction value corresponding to at least one of: (a) the absorbent article; (b) the portion of the absorbent article; or (c) an individual associated with the absorbent article or portion of the absorbent article. In various aspects, the individual-specific biological prediction value is based on the biological feature depicted within the pixel data of the digital image of the absorbent article or the portion of the absorbent article.

In accordance with the above, and with the disclosure herein, the present disclosure includes improvements in computer functionality or in improvements to other technologies at least because the disclosure describes that, e.g., an imaging server, or otherwise computing device (e.g., a user computer device), is improved where the intelligence or predictive ability of the imaging server or computing device is enhanced by a trained (e.g., machine learning trained) biological based learning model. The biological based learning model, executing on the imaging server or computing device, is able to accurately identify, based on pixel data of training images depicting absorbent articles or portions of absorbent articles having respective biological features depicted within the pixel data, an individual-specific biological prediction value designed to address at least one biological feature identifiable within pixel data of an image of absorbent article of a specific individual comprising a biological feature (e.g., stool, BM, urine, blood, or other such waste by-product) of the individual. That is, the present disclosure describes improvements in the functioning of the computer itself or "any other technology or technical field" because an imaging server or user computing device is enhanced with a plurality of training images (e.g., 10,000s of training images and related pixel data as feature data) to accurately predict, detect, or determine pixel data of an individual-specific images, such as newly provided customer images. For example, a biological based learning model, as trained in accordance with the disclosure herein, achieves an accuracy rate of 91% for an individual-specific biological prediction value regarding consistency (e.g., consistency type of stool and/or urine detected in an absorbent article image or portion of an absorbent article image) and an accuracy rate of 93% for an individual-specific biological prediction value regarding amount (e.g., amount of stool and/or urine detected in an absorbent article image or portion of an absorbent article image). This improves over the prior art at least because existing systems lack such predictive or classification functionality and are simply not capable of accurately analyzing individual-specific images to output a predictive result to address at least one feature identifiable within the pixel data comprising at least one biological feature depicted within the pixel data of the digital image of the absorbent article or the portion of the absorbent article.

For similar reasons, the present disclosure relates to improvements to other technologies or technical fields at least because the present disclosure describes or introduces improvements to computing devices in the biological digital imaging field, whereby the trained biological based learning model executing on the imaging device(s) or computing devices improves the field of biological digital imaging and health care, with digital and/or artificial intelligence based analysis of digital images of absorbent articles or portions of absorbent articles having respective biological features depicted within the pixel data of respective training images.

In addition, the present disclosure relates to improvement to other technologies or technical fields at least because the present disclosure describes or introduces improvements to computing devices in field of imaging and, in particular, detecting biological features within images.

In addition, a biological based learning model, executing on the imaging device(s) or computing devices, improves the underlying computer device (e.g., imaging server(s) and/or user computing device), where such computer devices are made more efficient by the configuration, adjustment, or adaptation of a given machine-learning network architecture. For example, in some aspects, fewer machine resources (e.g., processing cycles or memory storage) may be used by decreasing computational resources by decreasing machine-learning network architecture needed to analyze images, including by reducing depth, width, image size, or other machine-learning based dimensionality requirements. Such reduction frees up the computational resources of an underlying computing system, thereby making it more efficient.

Still further, the present disclosure relates to improvement to other technologies or technical fields at least because the present disclosure describes or introduces improvements to computing devices in the field of security and/or image processing, where, at least in some aspects, images of users may be preprocessed (e.g., cropped or otherwise modified) to define extracted or depicted regions of an absorbent article or a portion of an absorbent article without depicting personal identifiable information (PII) of a user or individual. For example, simple cropped or redacted portions of an image may be used by the biological based learning model described herein, which eliminates the need of transmission of private photographs of individuals or portions of individuals across a computer network (where such images may be susceptible of interception by third parties). Such features provide a security improvement, i.e., where the removal of PII (e.g., private area features) provides an improvement over prior systems because cropped or redacted images, especially ones that may be transmitted over a network (e.g., the Internet), are more secure without including PII information of an individual. Such system may allow for predictions or determinations such as stool, urine, or other waste relationship with an individual's skin, and without PII and images of the individual's skin itself. Accordingly, the systems and methods described herein operate without the need for such essential information, which provides an improvement, e.g., a security improvement, over prior system. In addition, the use of cropped images, at least in some aspects, allows the underlying system to store and/or process smaller data size images, which results in a performance increase to the underlying system as a whole because the smaller data size images require less storage memory and/or processing resources to store, process, and/or otherwise manipulate by the underlying computer system.

In addition, the present disclosure includes specific features other than what is well-understood, routine, conventional activity in the field, or adding unconventional steps that confine the claim to a particular useful application, e.g., analyzing pixel data of one or more digital images depicting absorbent articles or portions of absorbent articles.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed therein. It should be understood that each figure depicts an aspect of a particular aspect of the disclosed system and methods, and that each of the figures is intended to accord with a possible aspect thereof. Further, wherever possible, the following description refers to the reference numerals included in the following figures, in which features depicted in multiple figures are designated with consistent reference numerals.

There are shown in the drawings arrangements which are presently discussed, it being understood, however, that the present aspects are not limited to the precise arrangements and instrumentalities shown, wherein:

FIG. 4 illustrates a biological digital imaging method for analyzing pixel data of one or more digital images depicting absorbent articles or portions of absorbent articles, in accordance with various aspects disclosed herein.

The figures depict preferred aspects for purposes of illustration only. Alternative aspects of the systems and methods illustrated herein may be employed without departing from the principles of the invention described herein.

DETAILED DESCRIPTION OF THE INVENTION

Figure 1:
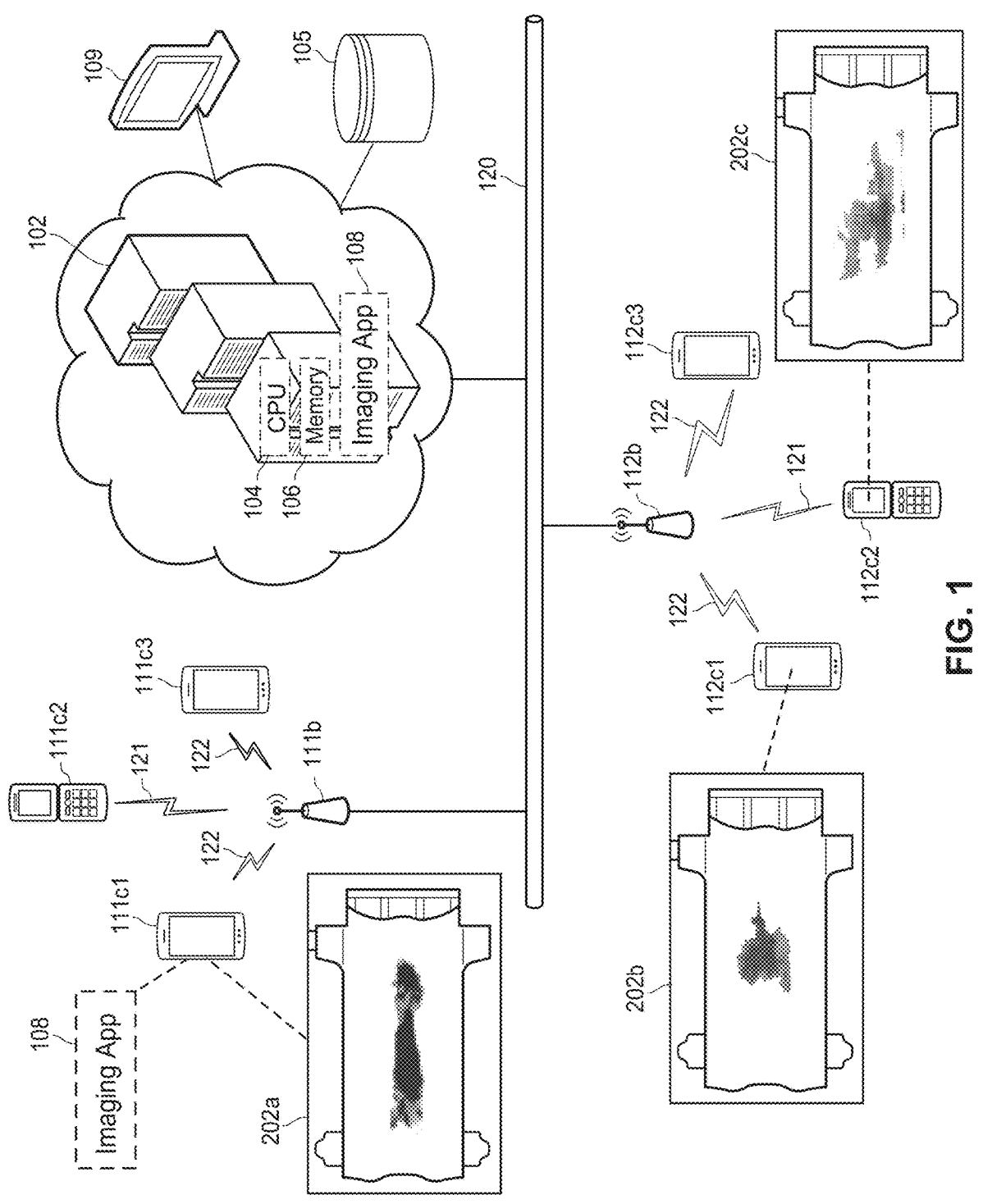
FIG. 1 illustrates an example biological digital imaging system configured to analyze pixel data of one or more digital images depicting absorbent articles or portions of absorbent articles, in accordance with various aspects disclosed herein.

FIG. 1 illustrates an example biological digital imaging system 100 configured to analyze pixel data of one or more digital images (e.g., any one or more of images 202a, 202b, and/or 202c) depicting absorbent articles or portions of absorbent articles, in accordance with various aspects disclosed herein. Absorbent articles, and preferably wearable absorbent articles, may include reusable diapers, disposable diapers, reusable absorbent pants, disposable absorbent pants, reusable or disposable pads or inserts usable in concert with a diaper, pant, or underwear, feminine protection products such as absorbent pads, facial tissues, disposable wipes and bandages.

More generally, in various aspects, biological digital imaging system 100 comprises or implements systems and methods providing an excrement-related analysis or prediction via the capture and analysis of an image of a portion of a physical medium or an absorbent article (e.g., a diaper or other such physical mediums) containing excrement. Similarly, and in various aspects, biological digital imaging system 100 comprises or implements systems and methods to digitally analyze images of used physical mediums or absorbent articles (e.g., diapers or other such physical mediums). For example, in a simple implementation, the biological digital imaging system may comprise or implement systems and methods that captures a corner or other portion of an absorbent article compares the excrement identified therein for generation of an individual-specific biological prediction value. Analysis of biological features may include analysis of such biological features on physical mediums or absorbent articles such as absorbent article(s), diapers, underwear, tissue, cotton garments, or the like.

Generally, as referred to herein, an absorbent article may refer to an absorbent article worn and/or soiled by a specific infant or individual, such as any of the absorbent article(s) (e.g., diapers) or portion(s) of absorbent articles (e.g., diapers) as depicted or described herein for any of FIGS. 1, 2, 3, 4, 5A-D, and/or 6, and/or otherwise described herein. The digital images (e.g., 202*a*, 202*b*, and/or 202*c*) may depict a soiled absorbent article or absorbent article portion, and may be used for various purposes, e.g., in order to train or implement artificial intelligence related models, make recommendations, provide absorbent article usage or otherwise product advice. The images may depict portions of a wearer's skin, which may later be cropped out or otherwise normalized by the system or method. The images may comprise pixel data depicting at least a portion of one or more of a bodily waste or excrement such as stool(s), bowel movement (BM) residue, BM blowouts, urine, leakage, blood and/or other such biological features of the specific individual (e.g., infant). The pixel data may contain biological features (i.e., property, measurement, assessment, etc.) identifiable by or related by colors, variation in color or texture (i.e., degree of homogeneity or lack thereof), reflectance or "shininess", amounts, consistencies, shapes or patterns, locations, and/or textures thereof as depicted on, in, or around the absorbent article or absorbent article portion of the image. The pixel data may also provide the ability to determine the degree to which an underlying pattern, such as a pattern on a topsheet (i.e., wearer-facing surface of an absorbent article), may be visible through the stool, urine, or menses. Reference pixel data, such as from the medical or scientific literature or third party databases may also be used by the system as a point of comparison in any analyses described herein.

Pixel data may include individual pixels, groups or patterns of pixels, reference pixels, or transformations of groups or series of pixels (e.g., rates of change in a property among a given pixel grouping). A reference pixel may include one or more of the following: a pixel (or pixel group) in a set portion of an image (such as a corner of an article), or on a specific feature of the article (such as a fastener) or a pixel, or group thereof, in a location with a high probability of containing the substance of interest (stool, urine, menses, etc.).

As used herein, the term biological digital imaging system may refer to a system configured for the capture and analysis of pixel data of used absorbent articles expected to contain an excrement. For example, a simple biological digital imaging system may compare a first reference pixel (or group of reference pixels) to a second reference pixel (or group of reference pixels). The first reference pixel may comprise a corner of an image, or a diaper feature such as a fastener, expected to be free of excrement, while the second reference pixel may be located in a region commonly expected to contain excrement, such as the center of the diaper. An exemplary analysis may comprise the assessment of whether stool is present in the diaper or the color or consistency of the stool. Another example of a simple biological digital imaging system may involve scanning the entire section of the diaper for "red" color, potentially indicating the presence of blood. In other embodiments of biological digital imaging systems, machine learning approaches may be included to enhance the functionality and utility of the system for the user.

In the example aspect of FIG. 1, biological digital imaging system 100 includes server(s) 102, which may comprise one or more computer servers. In various aspects server(s) 102 comprise multiple servers, which may comprise multiple, redundant, or replicated servers as part of a server farm. In still further aspects, server(s) 102 may be implemented as cloud-based servers, such as a cloud-based computing platform. For example, imaging server(s) 102 may be any one or more cloud-based platform(s) such as MICROSOFT AZURE, AMAZON AWS, or the like. Server (s) 102 may include one or more processor(s) 104 as well as one or more computer memories 106. In various aspects, server(s) 102 may be referred to herein as "imaging server (s)."

Memory 106 may include one or more forms of volatile and/or non-volatile, fixed and/or removable memory, such as read-only memory (ROM), electronic programmable read-only memory (EPROM), random access memory (RAM), erasable electronic programmable read-only memory (EE-PROM), and/or other hard drives, flash memory, MicroSD cards, and others. MemorieMemories 106 may store an operating system (OS) (e.g., Microsoft Windows, Linux, UNIX, etc.) capable of facilitating the functionalities, apps, methods, or other software as discussed herein. Memory 106 may also store an imaging application (app) 108, which may comprise or may be configured to access an artificial intelligence-based model, such as a machine learning model, trained on various images (e.g., images 202*a*, 202*b*, and/or 202*c*), as described herein. Additionally, or alternatively, images (e.g., training images), such as any one or more of images 202*a*, 202*b*, and/or 202*c*, may also be stored in database 105, which is accessible or otherwise communicatively coupled to imaging server(s) 102. In addition, memories 106 may also store machine readable instructions, including any of one or more application(s) (e.g., an imaging application as described herein), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. It should be appreciated that one or more other applications may be envisioned and that are executed by the processor(s) 104.

The processor(s) 104 may be connected to the memories 106 via a computer bus responsible for transmitting electronic data, data packets, or otherwise electronic signals to and from the processor(s) 104 and memories 106 in order to implement or perform the machine readable instructions, methods, processes, elements or limitations, as illustrated, depicted, or described for the various flowcharts, illustrations, diagrams, figures, and/or other disclosure herein.

Processor(s) 104 may interface with memory 106 via the computer bus to execute an operating system (OS). Processor(s) 104 may also interface with the memory 106 via the computer bus to create, read, update, delete, or otherwise access or interact with the data stored in memories 106 and/or the database 105 (e.g., a relational database, such as Oracle, DB2, MySQL, or a NoSQL based database, such as MongoDB). The data stored in memories 106 and/or database 105 may include all or part of any of the data or information described herein, including, for example, training images and/or other images (e.g., including any one or more of images 202*a*, 202*b*, and/or 202*c*) and/or other images and/or information of regarding a given absorbent article or absorbent article as used by individual, including heath data, product metrics, reference data, or the like, or as otherwise described herein.

Imaging server(s) 102 may further include a communication component configured to communicate (e.g., send and receive) data via one or more external/network port(s) to one or more networks or local terminals, such as computer network 120 and/or terminal 109 (for rendering or visualizing) described herein. In some aspects, imaging server(s) 102 may include a client-server platform technology such as ASP.NET, Java J2EE, Ruby on Rails, Node.js, a web service or online API, responsive for receiving and responding to electronic requests. The imaging server(s) 102 may implement the client-server platform technology that may interact, via the computer bus, with the memories(s) 106 (including the applications(s), component(s), API(s), data, etc. stored therein) and/or database 105 to implement or perform the machine readable instructions, methods, processes, elements or limitations, as illustrated, depicted, or described for the various flowcharts, illustrations, diagrams, figures, and/or other disclosure herein.

In various aspects, the imaging server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some aspects, computer network 120 may comprise a private network or local area network (LAN). Additionally, or alternatively, computer network 120 may comprise a public network such as the Internet.

Imaging server(s) 102 may further include or implement an operator interface configured to present information to an administrator or operator and/or receive inputs from the administrator or operator. As shown in FIG. 1, an operator interface may provide a display screen (e.g., via terminal 109). Imaging server(s) 102 may also provide I/O components (e.g., ports, capacitive or resistive touch sensitive input panels, keys, buttons, lights, LEDs), which may be directly accessible via, or attached to, imaging server(s) 102 or may be indirectly accessible via or attached to terminal 109. According to some aspects, an administrator or operator may access the server 102 via terminal 109 to review information, make changes, input training data or images, initiate training of biological based learning model (e.g., as described for FIGS. 5A-D or otherwise herein), and/or perform other functions.

As described herein, in some aspects, imaging server(s) 102 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the model(s), such as AI models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 104 (e.g., working in connection with the respective operating system in memories 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

As shown in FIG. 1, imaging server(s) 102 are communicatively connected, via computer network 120 to the one or more user computing devices 111*c*1-111*c*3 and/or 112*c*1-112*c*3 via base stations 111*b* and 112*b*. In some aspects, base stations 111*b* and 112*b* may comprise cellular base stations, such as cell towers, communicating to the one or more user computing devices 111*c*1-111*c*3 and 112*c*1-112*c*3 via wireless communications 121 based on any one or more of various mobile phone standards, including NMT, GSM, CDMA, UMMTS, LTE, 5G, or the like. Additionally, or alternatively, base stations 111*b* and 112*b* may comprise routers, wireless switches, or other such wireless connection points communicating to the one or more user computing devices 111*c*1-111*c*3 and 112*c*1-112*c*3 via wireless communications 122 based on any one or more of various wireless standards, including by non-limiting example, IEEE 802.11a/b/c/g (WIFI), the BLUETOOTH standard, or the like.

Any of the one or more user computing devices 111*c*1-111*c*3 and/or 112*c*1-112*c*3 may comprise mobile devices and/or client devices for accessing and/or communications with imaging server(s) 102. Such mobile devices may comprise one or more mobile processor(s) and/or an imaging device for capturing images, such as images as described herein (e.g., any one or more of images 202*a*, 202*b*, and/or 202*c*). In various aspects, user computing devices 111*c*1-111*c*3 and/or 112*c*1-112*c*3 may comprise a mobile phone (e.g., a cellular phone), a tablet device, a personal data assistance (PDA), or the like, including, by non-limiting example, an APPLE iPhone or iPad device or an ANDROID based mobile phone or tablet.

In various aspects, the one or more user computing devices 111*c*1-111*c*3 and/or 112*c*1-112*c*3 may implement or execute an operating system (OS) or mobile platform such as APPLE iOS and/or ANDROID operation system. Any of the one or more user computing devices 111*c*1-111*c*3 and/or 112*c*1-112*c*3 may comprise one or more processors and/or one or more memories for storing, implementing, or executing computing instructions or code, e.g., a mobile application, as described in various aspects herein. As shown in FIG. 1, imaging app 108 and/or an imaging application as described herein, or at least portions thereof, may also be stored locally on a memory of a user computing device (e.g., user computing device 111*c*1).

User computing devices 111*c*1-111*c*3 and/or 112*c*1-112*c*3 may comprise a wireless transceiver to receive and transmit wireless communications 121 and/or 122 to and from base stations 111*b* and/or 112*b*. In various aspects, pixel based images (e.g., images 202*a*, 202*b*, and/or 202*c*) may be transmitted via computer network 120 to imaging server(s)

102 for training of artificial intelligence based model(s) (e.g., as described herein for FIGS. 5A-D) and/or imaging analysis as described herein.

In addition, the one or more user computing devices 111c1-111c3 and/or 112c1-112c3 may include an imaging device and/or digital video camera for capturing or taking digital images and/or frames (e.g., which can be any one or more of images 202a, 202b, and/or 202c). Each digital image may comprise pixel data for training or implementing model(s), such as AI or machine learning models, as described herein. For example, an imaging device and/or digital video camera of, e.g., any of user computing devices 111c1-111c3 and/or 112c1-112c3, may be configured to take, capture, or otherwise generate digital images (e.g., pixel based images 202a, 202b, and/or 202c) and, at least in some aspects, may store such images in a memory of a respective user computing devices. Additionally, or alternatively, such digital images may also be transmitted to and/or stored on memory(ies) 106 and/or database 105 of server(s) 102.

Still further, each of the one or more user computer devices 111c1-111c3 and/or 112c1-112c3 may include a display screen for displaying graphics, images, text, individual-specific biological prediction value(s), data, pixels, features, graphs, historical assessments or comparisons, and/or other such visualizations or information as described herein. In various aspects, graphics, images, text individual-specific biological prediction value(s), data, pixels, features, and/or other such visualizations or information may be received from imaging server(s) 102 for display on the display screen of any one or more of user computer devices 111c1-111c3 and/or 112c1-112c3. Prediction values may include predictions of future outcomes, such as leakage from the article, indications of new and/or abnormal (for the individual) values of measured parameters, analyses, historical comparisons, indications of status quo (i.e., no changes in measured parameters observed), and other information relevant to a user, caregiver, physician, or relevant third party. Additionally, or alternatively, a user computer device may comprise, implement, have access to, render, or otherwise expose, at least in part, an interface or a guided user interface (GUI) for displaying text and/or images on its display screen.

In some aspects, computing instructions and/or applications executing at the server (e.g., server(s) 102) and/or at a mobile device (e.g., mobile device 111c1) may be communicatively connected for analyzing pixel data of one or more digital images depicting absorbent articles or portions of absorbent articles, as described herein. For example, one or more processors (e.g., processor(s) 104) of server(s) 102 may be communicatively coupled to a mobile device via a computer network (e.g., computer network 120). In such aspects, an imaging app may comprise a server app portion configured to execute on the one or more processors of the server (e.g., server(s) 102) and a mobile app portion configured to execute on one or more processors of the mobile device (e.g., any of one or more user computing devices 111c1-111c3 and/or 112c1-112c3) and/or other such standalone imaging device. In such aspects, the server app portion is configured to communicate with the mobile app portion. The server app portion or the mobile app portion may each be configured to implement, or partially implement, one or more of: (1) obtaining, at one or more processors, a digital image depicting, for example, an absorbent article or a portion of an absorbent article, the digital image comprising pixel data; (2) analyzing, by an imaging application (app) executing on the one or more processors, the digital image of the absorbent article or the portion of the absorbent article to detect a biological feature depicted within the pixel data of the digital image of the absorbent article or the portion of the absorbent article; and/or (3) generating, by the imaging app, an individual-specific biological prediction value corresponding to at least one of: (a) the absorbent article; (b) the portion of the absorbent article; or (c) an individual associated with the absorbent article or portion of the absorbent article.

Figure 2:
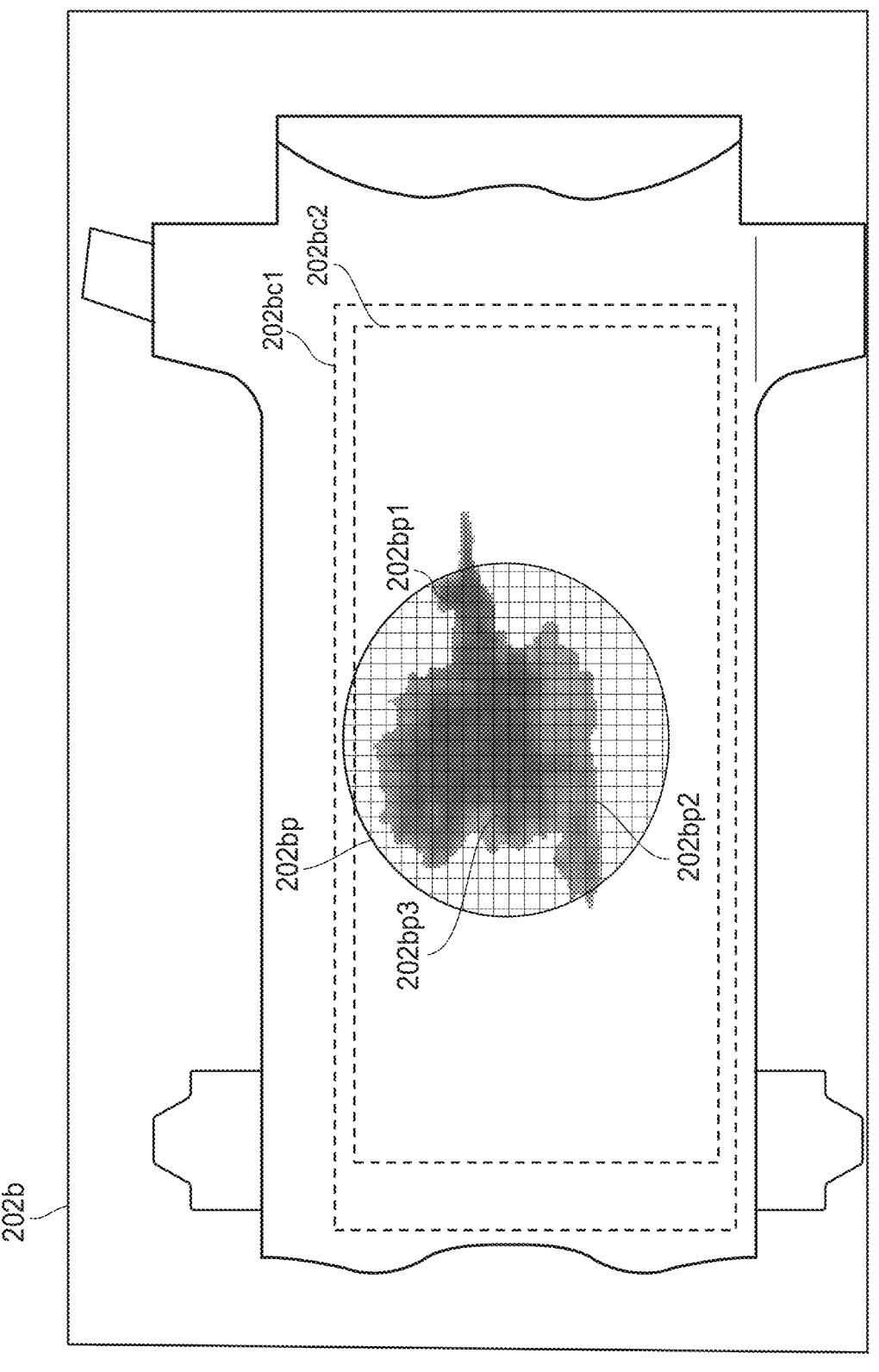
FIG. 2 illustrates an example image and its related pixel data that may be used for generating individual-specific biological prediction value(s) and/or training a biological based learning model, in accordance with various aspects disclosed herein.

FIG. 2 illustrates an example image 202b and its related pixel data that may be used for generating individual-specific biological prediction value(s) and/or training a biological based learning model, in accordance with various aspects disclosed herein. In various aspects, as shown for FIG. 1, image 202b may be an image captured depicting an absorbent article (e.g., diaper) or portion of an absorbent article (e.g., diaper). Image 202b (as well as images 202a and/or 202c) may be transmitted to server(s) 102 via computer network 120, as shown for FIG. 1.

More generally, digital images, such as example images 202a, 202b, and 202c, may be collected or aggregated at imaging server(s) 102 and may be analyzed by, and/or used to train, a biological based learning model (e.g., an AI model such as a machine learning imaging model as described herein). Each of these images may comprise pixel data (e.g., RGB data) comprising feature data and corresponding to absorbent article(s) and/or portions of absorbent article(s), within the respective image. The pixel data may be captured by an imaging device of one of the user computing devices (e.g., one or more user computer devices 111c1-111c3 and/or 112c1-112c3).

With respect to digital images as described herein, pixel data (e.g., pixel data 202bp of FIG. 2) comprises individual points or squares of data within an image, where each point or square represents a single pixel (e.g., each of pixel 202bp1, pixel 202bp2, and pixel 202bp3) within an image. Each pixel may be at a specific location within an image. In addition, each pixel may have a specific color (or lack thereof). Pixel color may be determined by a color format and related channel data associated with a given pixel. For example, a popular color format is a 1976 CIELAB (also referenced herein as the "CIE L*-a*-b*" or simply "L*a*b*" or "LAB" color format) color format that is configured to mimic the human perception of color. Namely, the L*a*b* color format is designed such that the amount of numerical change in the three values representing the L*a*b* color format (e.g., L*, a*, and b*) corresponds roughly to the same amount of visually perceived change by a human. This color format is advantageous, for example, because the L*a*b* gamut (e.g., the complete subset of colors included as part of the color format) includes both the gamuts of Red (R), Green (G), and Blue (B) (collectively RGB) and Cyan (C), Magenta (M), Yellow (Y), and Black (K) (collectively CMYK) color formats.

In the L*a*b* color format, color is viewed as point in three dimensional space, as defined by the three-dimensional coordinate system (L*, a*, b*), where each of the L* data, the a* data, and the b* data may correspond to individual color channels, and may therefore be referenced as channel data. In this three-dimensional coordinate system, the L* axis describes the brightness (luminance) of the color with values from 0 (black) to 100 (white). The a* axis describes the green or red ratio of a color with positive a* values (+a*) indicating red hue and negative a* values (−a*) indicating green hue. The b* axis describes the blue or yellow ratio of a color with positive b* values (+b*) indicating yellow hue and negative b* values (−b*) indicating blue hue. Generally, the values corresponding to the a* and b* axes may be unbounded, such that the a* and b* axes may include any suitable numerical values to express the axis boundaries. However, the a* and b* axes may typically include lower and upper boundaries that range from approximately 150 to −150. Thus, in this manner, each pixel color value may be represented as a three-tuple of the L*, a*, and b* values to create a final color for a given pixel.

As another example, an additional or alternative color format includes the red-green-blue (RGB) format having red, green, and blue channels. That is, in the RGB format, data of a pixel is represented by three numerical RGB components (Red, Green, Blue), that may be referred to as a channel data, to manipulate the color of pixel's area within the image. In some implementations, the three RGB components may be represented as three 8-bit numbers for each pixel. Three 8-bit bytes (one byte for each of RGB) may be used to generate 24-bit color. Each 8-bit RGB component can have 256 possible values, ranging from 0 to 255 (i.e., in the base 2 binary system, an 8-bit byte can contain one of 256 numeric values ranging from 0 to 255). This channel data (R, G, and B) can be assigned a value from 0 to 255 that can be used to set the pixel's color. For example, three values like (250, 165, 0), meaning (Red=250, Green=165, Blue=0), can denote one Orange pixel. As a further example, (Red=255, Green=255, Blue=0) means Red and Green, each fully saturated (255 is as bright as 8 bits can be), with no Blue (zero), with the resulting color being Yellow. As a still further example, the color black has an RGB value of (Red=0, Green=0, Blue=0) and white has an RGB value of (Red=255, Green=255, Blue=255). Gray has the property of having equal or similar RGB values, for example, (Red=220, Green=220, Blue=220) is a light gray (near white), and (Red=40, Green=40, Blue=40) is a dark gray (near black).

In this way, the composite of three RGB values creates a final color for a given pixel. With a 24-bit RGB color image, using 3 bytes to define a color, there can be 256 shades of red, and 256 shades of green, and 256 shades of blue. This provides 256×256×256, i.e., 16.7 million possible combinations or colors for 24 bit RGB color images. As such, a pixel's RGB data value indicates a degree of color or light each of a Red, a Green, and a Blue pixel is comprised of. The three colors, and their intensity levels, are combined at that image pixel, i.e., at that pixel location on a display screen, to illuminate a display screen at that location with that color. In is to be understood, however, that other bit sizes, having fewer or more bits, e.g., 10-bits, may be used to result in fewer or more overall colors and ranges. Further, it is to be understood that the pixel data may contain additional or alternative color format and channel data. For example, the pixel data may include color data expressed in a hue saturation value (HSV) format or hue saturation lightness (HSL) format.

As a whole, the various pixels, positioned together in a grid pattern (e.g., pixel data 202*bp*), form a digital image or portion thereof. A single digital image can comprise thousands or millions of pixels or channels. Images can be captured, generated, stored, and/or transmitted in a number of formats, such as JPEG, TIFF, PNG and GIF. These formats use pixels to store or represent the image.

With reference to FIG. 2, example image 202*b* illustrates an absorbent article or a portion of an absorbent article. More specifically, image 202*b* comprises pixel data, including pixel data 202*bp* defining an absorbent article or a portion of the absorbent article. Pixel data 202*bp* includes a plurality of pixels including pixel 202*bp*1, pixel 202*bp*2, and pixel 202*bp*3. In example image 202*b*, each of pixel 202*bp*1, pixel 202*bp*2, and pixel 202*bp*3 are each representative of features (e.g., biological features) detectable or otherwise identifiable within image 202*b*. Generally, in various aspects, biological features may comprise one or more of urine, stool(s), bowel movement (BM) residue, or other such biological waste. Each of these features may be determined from or otherwise based on one or more pixels in a digital image (e.g., image 202*b*). For example, with respect to image 202*b*, pixel 202*bp*1 may depict, or otherwise indicate, stool or BM residue and therefore comprise a darker pixel color (e.g., pixels with relatively low L* values). Additionally, or alternatively, pixel 202*bp*1 may comprise a brownish pixel color (e.g., pixels with relatively higher a* values (red) and b* values (yellow) for LAB based pixel color scheme and/or higher R (red) and G (green) values, with darker hues, for an RGB based pixel color scheme), thereby indicating or depicting biological feature (e.g., stool or BM residue) for pixel 202*bp*1 of image 202*b*.

As a further example, with respect to image 202*b*, pixel 202*bp*2 may depict, or otherwise indicate, urine and therefore comprise a lighter pixel color (e.g., pixels with relatively higher L* values). Additionally, or alternatively, pixel 202*bp*2 may comprise a yellowish pixel color (e.g., pixels with relatively higher b* values (yellow) for LAB based pixel color scheme and/or higher R (red) and G (green) values, with lighter hues, for an RGB based pixel color scheme), thereby indicating or depicting biological features (e.g., urine) for pixel 202*bp*2 of image 202*b*.

As yet a further example, with respect to image 202*b*, pixel 202*bp*3 may depict, or otherwise indicate, a second portion of stool or BM residue, stool or BM residue together with urine, and/or a texture of the absorbent article or absorbent article portion. Therefore 202*bp*3 may comprise a medium-dark pixel color (e.g., pixels with relatively medium-dark L* values). Additionally, or alternatively, pixel 202*bp*1 may comprise a medium-dark pixel color (e.g., pixels with relatively medium a* values (red to green) and b* values (yellow to blue) for LAB based pixel color scheme and/or medium R (red), G (green), B (blue) values, with medium value hues, for an RGB based pixel color scheme), thereby indicating or depicting biological feature(s) (e.g., stool, BM residue, urine as depicted on wrinkles and/or textures of the absorbent article or absorbent article portion of image 202*b*) for pixel 202*bp*3 of image 202*b*.

In addition to pixels 202*bp*1, 202*bp*2, and 202*bp*3, pixel data 202*bp* includes various other pixels including remaining portions of an absorbent article or portion of the absorbent article of image 202*b* that may be analyzed and/or used for training of AI model(s), and/or analysis by already trained models, such as a biological based learning model as described herein. For example, pixel data 202*bp* further includes pixels representative of features of the edge(s) of the absorbent article of image 202*b*, fasteners or other product features of the absorbent article of image 202*b*, dimensions and size of the absorbent article of image 202*b*, wrinkles/textures of the absorbent article of image 202*b*, and other classifications and/or features as shown in FIG. 2, each of which may have their own respective pixel data (e.g., related LAB, RGB, and/or other pixel data).

As described in various aspects, pixel data of image 202*b* (e.g., pixel 202*bp*1, pixel 202*bp*2, and pixel 202*bp*3) may be used to generate an individual-specific biological prediction value corresponding to at least one of: (a) the absorbent article; (b) the portion of the absorbent article; or (c) an individual associated with the absorbent article or portion of the absorbent article. In addition, pixel data of image 202*b* (e.g., pixel 202*bp*1, pixel 202*bp*2, and pixel 202*bp*3) may be used for training artificial intelligence (AI) models, including, for example, a biological based learning model as described herein for FIGS. 4 and 5A-5D.

In some aspects, a digital image, such as a training image, an image as submitted by users, or otherwise a digital image (e.g., any of images 202a, 202b, and/or 202c), may be or may comprise a cropped image. Generally, a cropped image is an image with one or more pixels removed, deleted, or hidden from an originally captured image. For example, with reference to FIG. 2, image 202b represents an original image. Cropped portion 202bc1 represents a first cropped portion of image 202b that removes portions of the absorbent article or absorbent article portion (outside of cropped portion 202bc1 is removed) that may not include personally identifiable information (PII). As a further example, cropped portion 202bc2 represents a second cropped portion of image 202b that removes portions of the image (outside of cropped portion 202bc2 is removed). In various aspects, analyzing and/or use of cropped images for training can yield improved accuracy of a biological based learning model. It can also improve the efficiency and performance of the underlying computer system in that such system processes, stores, and/or transfers smaller size digital images. In addition, such features provide a security improvement, i.e., where the removal of PII provides an improvement over prior systems because cropped or redacted images, especially ones that may be transmitted over a network (e.g., the Internet), are more secure without including PII information of an individual. Importantly, the systems and methods described herein may operate without the need for such non-essential information, which provides an improvement, e.g., a security and a performance improvement, over conventional systems. Moreover, while FIG. 2 may depict and describe cropped images, it is to be understood, however, that other image types including, but not limited to, original, non-cropped images (e.g., original image 202b) and/or other types/sizes of cropped images (e.g., cropped portion 202bc1 of image 202a) may be used or substituted as well.

It is to be understood that the disclosure for image 202b of FIG. 2 applies the same or similarly for other digital images described herein, including, for example, images 202a and 202c, where such images also comprise pixels that may be analyzed and/or used for analysis and/or training of AI model(s) as described herein.

In addition, digital images of an absorbent article or absorbent article portion, as described herein, may depict various biological features of various individuals, which may be used to train biological based learning models across a variety of different individuals having a variety of different biological waste residue or types. For example, as illustrated for images 202a, 202b, and 202c, the absorbent articles and/or absorbent article portions of these images comprise different shapes, patterns, sizes, positions, colors, variations in color, homogeneity, location within the absorbent article, reflectance, and/or types of biological features identifiable with the pixel data of the respective images. These biological features indicate, for example, one or more types of predictions, classifications, and/or scores corresponding to urine, stools, BM residue, etc., which of which may be classified, predicted, and/or scored by different consistencies, e.g., including by way of non-limiting example, watery without curds, watery with curds, mucousy, soft, pasty, and hard.

In various aspects, digital images (e.g., images 202a, 202b, and 202c), whether used as training images, or used as images for analysis, such as generation of individual-specific biological prediction values, may comprise multiple angles or perspectives depicting different angles, viewpoints, perspectives, or portions of absorbent articles having biological features. The multiple angles or perspectives may include different views, positions, closeness of the absorbent articles, absorbent article portions, and/or backgrounds, lighting conditions, or otherwise environments in which the absorbent article or absorbent article portion is positioned against in a given image.

Figure 3:
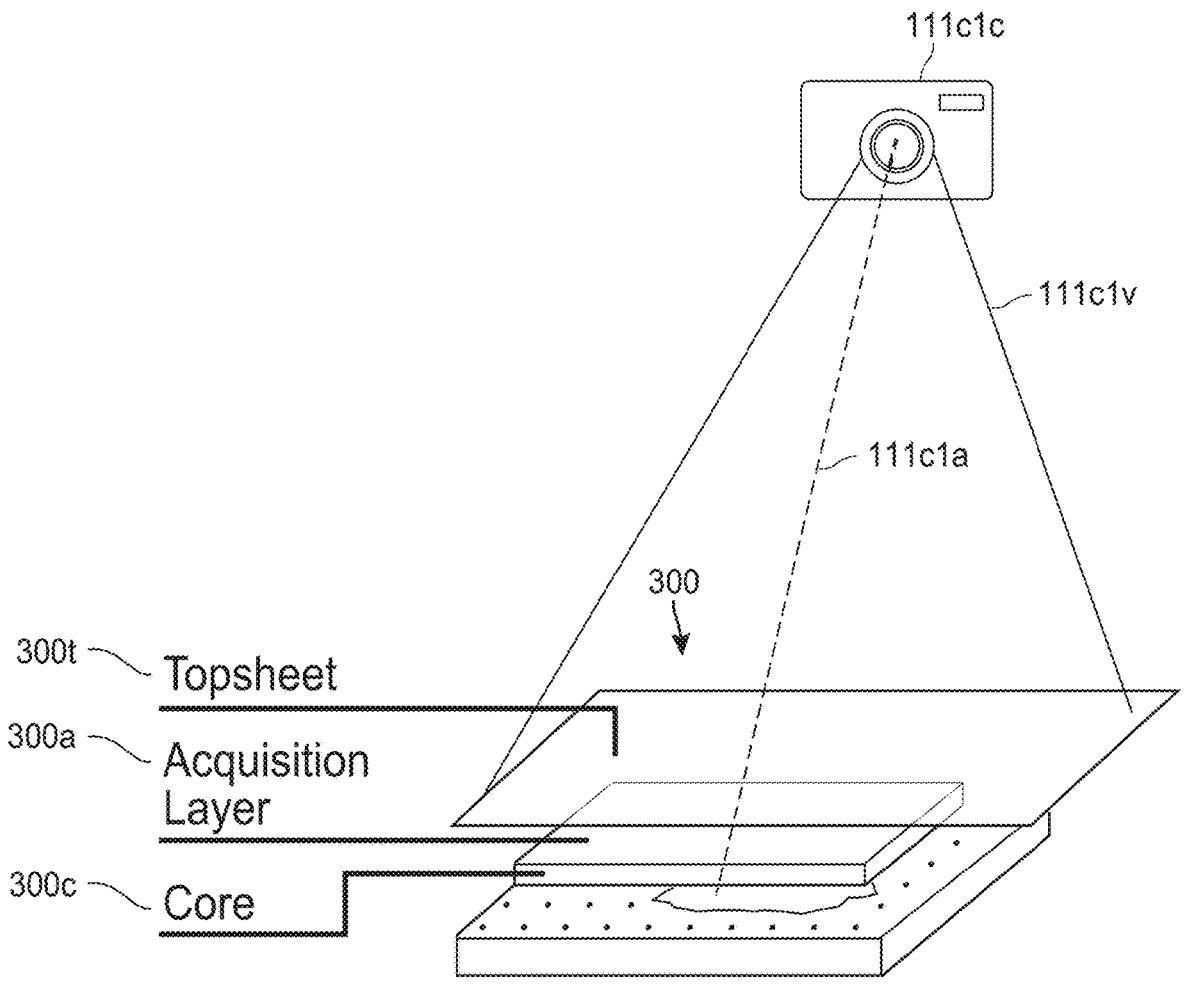
FIG. 3 illustrates an example camera of a computing device capturing a digital image depicting an absorbent article or a portion of an absorbent article, in accordance with various aspects disclosed herein.

FIG. 3 illustrates an example camera 111c1c of a computing device (e.g., 111c1) capturing a digital image (e.g., 202b) depicting an absorbent article or a portion of an absorbent article, in accordance with various aspects disclosed herein. As depicted in FIG. 3, camera 111c1 captures an image of absorbent article 300 in the field of view 111c1v of camera 111c1. Depending on the field of view 111c1v, camera 111c1c will capture an image of absorbent article 300 or a portion thereof.

Camera 111c1c may capture pixel data of multiple layers (e.g., 300t, 300a, and 300c) of absorbent article 300. For example, camera 111c1c is oriented pointed along axis 111c1a and can capture pixel data of one or more layers of absorbent article 300. In the example of FIG. 3, layer 300t is a top sheet layer of absorbent article 300 comprising a portion interfacing with skin of an infant and/or individual. Layer 300a is an application layer of absorbent article 300, which may initially receive biological waste (e.g., bowel movement residue and/or urine). Layer 300c is a core layer of absorbent article 300, which may provide absorption of biological waste (e.g., bowel movement residue and/or urine). It is to be understood, however, that absorbent articles will be differently configured, where not all absorbent articles comprise multiple layers as shown for FIG. 3, and where some absorbent articles have fewer or more layers (e.g., some absorbent articles may not include the acquisition layer 300a). In certain embodiments, pixel data of any skin present in the image may be analyzed to assess the presence of pressure markings, irritation, erythema, and/or edema. Alternatively, the system may analyze separately produced images of the skin or the wearer or user of the article. These analyses may result in information, such as a recommendation, to the user or caregiver to enable them to intervene to achieve a more desired skin condition.

Either together or alone, the various layers may change color, become deformed, or otherwise be modified upon receiving or absorbing biological waste. This may cause a change in the coloring, shape, texture of the absorbent article and cause a corresponding change in pixel data of any image(s) as captured by camera 111c1c (e.g., such as any of images 202a, 202b, and/or 202c), and thus provide a basis for analysis or use of images as described herein, such as generating individual-specific biological prediction value(s) and/or training biological based learning model(s), such as described herein with respect to FIGS. 4, 5A-5D, and 6. For example, in some aspects, the pixel data (e.g., color values, channels, luminance, or otherwise as described herein) may change or differ depending on whether the biological feature (s) are located or positioned above, on, within, under any of the given layers (e.g., topsheet layer, application layer, core layer, etc.). For example, variations in color and comparison colors in distance range, pattern, variations, and location of the pixel on an absorbent article may be analyzed, in addition to, or in alternative to, color, pattern and/or shape of the color, reflectance, shininess of BM, and/or 3D dimension of the pixels. Such changes or differences in the pixel data for the biological feature(s), as affected by the positioning with the various layers, may be used by the systems and methods disclosed herein to determine or generate specific predictions or classifications (e.g., individual-specific biological prediction value), such as related to the amount, consistency, color, type, etc. of the biological features (e.g., urine, stool, blood, etc.) appearing a given physical medium or absorbent article, or as otherwise described herein.

FIG. 4 illustrates a biological digital imaging method 400 for analyzing pixel data of one or more digital images (e.g., such as any of images 202a, 202b, and/or 202c) depicting absorbent articles or portions of absorbent articles, in accordance with various aspects disclosed herein. At block 402, biological digital imaging method 400 comprises obtaining, at one or more processors, a digital image (e.g., image 202b) depicting an absorbent article or a portion of an absorbent article. The digital image may comprise pixel data as described herein with respect to FIG. 2 or otherwise herein. Images, as used with the method 400, and more generally as described herein, are pixel based images as captured by an imaging device (e.g., an imaging device, such as camera 111c1c, of user computing device 111c1). In some aspects an image may comprise or refer to a plurality of images such as a plurality of images (e.g., frames) as collected using a digital video camera (e.g., camera 111c1c). Frames comprise consecutive images defining motion, and can comprise a movie, a video, or the like.

The one or more processors may comprise local processors ("edge" processors) (e.g., processor(s) operating on user computing device 111c1) and/or server (cloud) processors (e.g., processor(s) operating on imaging server(s) 102). In some aspects, the one or more processors may be processors of a LUMI device as provided by the PAMPERS brand, where the LUMI device comprises a camera for capturing digital image(s) (e.g., digital images 202a, 202b, and/or 202c). In some aspects, the LUMI device may be positioned at or near an infant (e.g., near a baby crib or otherwise) or other individual for obtaining digital image(s) depicting an absorbent article or a portion of an absorbent article, and related pixel data, as described herein. The pixel data may be analyzed on the local processors and/or server processor(s)), for example, by portions of imaging app 108 communicating across computer network 120.

At block 404, biological digital imaging method 400 comprises analyzing, by an imaging application (app) (e.g., imaging app 108) executing on the one or more processors (e.g., processor(s) of computing device 111c1 and/or imaging server(s) 102), the digital image (e.g., mage 202b) of the absorbent article or the portion of the absorbent article to detect a biological feature (e.g., stool, BM residue, and/or urine) depicted within the pixel data of the digital image of the absorbent article or the portion of the absorbent article. As described herein for FIG. 2 (or elsewhere herein), in various aspects, the one or more biological features may comprise a pixel color or type indicative of urine or a urine stain. Additionally, or alternatively, the one or more biological features may comprise a pixel color or type indicative of a stool or a stool residue.

In additional aspects, analysis of a digital image of an absorbent article or portion for detecting a biological feature comprises implementing object detection. Generally, object detection comprise a computer vision implementation that provides identification and location of objects within an image and/or video. Object detection can be used to determine, track, and count objects in a scene of an image or frame and count. Such objects can be labeled, and the labels, along with the images, can be used to train an artificial intelligence model, e.g., such as the biological based learning model as described herein. For example, with respect to the disclosure herein, object detection may comprise analyzing a given digital image to detect one or more image objects within the pixel data of the digital image of an absorbent article or a portion of the absorbent article. In various aspects, one or more objects detected via object detection may comprise at least one of: (a) the absorbent article (e.g., a diaper), or (b) a stain or color difference (e.g., urine, a stool, or other waste or residue) detected with the pixels of the absorbent article.

In some aspects, object detection may comprise a preprocessing technique for enhancing or otherwise optimizing images (and/or their related pixel data) for use in training the biological based learning model as described herein. That is, in some aspects, object detection may be used to identify and locate, within the pixel data of a given image, e.g., (1) the absorbent article (e.g., diaper) within the image; or (2) a stain or otherwise color difference on the absorbent article as identified within the image. The result of object detection provides cropped images for enhanced image analysis and, therefore, enhanced prediction of amount and consistency. For example, a biological based learning model (e.g., a deep learning model) as trained with and using images using object detection has achieved an average accuracy of 92% on consistency prediction and 93% on amount prediction.

By way of non-limiting example, object detection may be implemented by YOU ONLY LOOK ONCE (YOLO) software, which comprises a family of object detection architectures. For example, YOLOv5 is a fifth version implementation of an open-source software library developed by ULTRALYTICS INC. and it is efficient for preparing images for training custom image data and improves efficiency of real-time image detection and analysis. YOLOv5 comprises an AI model pretrained on an existing image data set (e.g., COCO dataset) for performing object detection. In such example aspects, training data may be prepared with a plurality of diaper images (taken on a flat board) and a second plurality of diaper images (taken on a baby or infant) that are manually labeled with two bounding box (i.e., labeled) classes: diaper and stain. Using the training data, a custom YOLOv5 based model is trained to implement objection detection to detect diaper and stain within the pixel data of image. Testing of such models have yielded an average 95% Intersection over Union (IOU) score.

The YOLOv5 based model, and enhanced images thereof, may then be used to determine the amount and consistency of urine, BM, or other waste residue as described herein, for example, as described for FIGS. 5A-5D herein and/or by the related MobileNet.V2 neural network (NN) architecture. For example, image analysis prediction may comprise detecting the color, amount, and consistency of diapers based on cropped images as outputted by, or determined by, a trained YOLOv5 model. For example, cropped images having stains or otherwise color differences may be used for color detection. Images that depict full absorbent articles (e.g., diaper images) may be used for amount and consistency prediction. For example, with respect to a consistency output, one or more categories may be defined. Such categories, may include, by way of non-limiting example, any one or more of the outputs: "mucous," "curds," "runny," "soft," "pasty," or "hard." In some aspects, for a consistency prediction, in a first step, a label (e.g., any one of "runny," "soft," "pasty," "hard," etc.) may be predicted by the Mobile Net V2 NN architecture or other biological based learning model. Then if the label is predicted as "runny," a further prediction may be performed by the Mobile Net V2 NN architecture or other biological based learning model to determine whether the stool has no mucous, thin mucous, thick mucus, etc. In this way, a combined label or other multiple labels or output may be determined for the consistency value. More generally, any one or more of color, amount, and consistency detection or prediction may be performed, for example, for color detection and color calibration 500c4 as described herein.

For example, with respect to color detection, images may be captured by consumers using mobile devices (e.g., mobile phones) in different light environments (e.g., in the wild image capture). White balancing may be used to adjust colors to match the color of the light source of a camera of the mobile device (and its surroundings when the image was captured) so that white objects (e.g., a diaper), appear white, and other objects such as a stool or BM, appear in its original color. For color identification, K-means clustering may be used to detect color (e.g., RGB values and/or L* values) of the stain or color difference on diapers and/or skin. A hyperparameter K may be set to a value of 3 to map or otherwise correspond to three pixel-clusters or types on the diaper, for example: (1) stain pixels (e.g., pixel 202bp1 indicating stool or BM residue comprising a darker pixel color, and/or pixel 202bp2 indicating urine comprising a lighter pixel color); (2) dirty diaper pixels (similar pixels to 202bp1 and/or 202bp2); and (3) clean diaper pixels (e.g., white pixels of pixel data 202bp indicating unstained or non-dirty areas).

Additionally, or alternatively, a K-means learning model may be used to detect or classify the color (e.g., RGB values) of stained, dirtied, and/or clean diaper(s) and/or skin. In such aspects, RGB values of stain related color (e.g., non-white color if on diapers, non-skin color if on skin) are assigned with color labels from LabelBox ('Green', 'Brown', 'Yellow', 'Tan', 'Black', 'White', 'Red') and are used to train a K-nearest neighbor model. Such K-nearest neighbor model may then be used to output a prediction or classification of a color category or value. In such aspects, the outputs from K-means clustering as performed by the nearest neighbor model are RGB values. Multiple RGB values can belong to a same color category, for example "green." The K-nearest neighbor model creates a "boundary" of RGB value(s) that is used to classify which RGB value belongs to which color category. The K-nearest neighbor model classifies a given RGB value using a plurality vote of its neighboring values, with the given RGB value being assigned to the class most common among its K nearest neighbors (e.g., where K is a positive integer, typically small, e.g., such as K=1, such that the RGB value is assigned to the class (the color category, e.g., "green") of that single nearest neighbor value).

With respect to amount and consistency detection, a prediction can be performed using a pretrained deep learning model, e.g., the biological based learning model such as a MobileNet model as described for FIGS. 5A-5D herein. For example, the color detected and/or number of pixels assigned or detected for a given color within an image are used by the biological based learning model to predict, classify, or otherwise determine amount and consistency of urnine, BM, and/or waste residence in an image comprising a diaper.

At block 406, biological digital imaging method 400 comprises generating, by the imaging app (e.g., imaging app 108), an individual-specific biological prediction value corresponding to at least one of: (a) the absorbent article (e.g., as shown in image 202b); (b) the portion of the absorbent article (e.g., a portion of image 202b); or (c) an individual (e.g., an infant) associated with the absorbent article or portion of the absorbent article. The individual-specific biological prediction value is based on the biological feature depicted within the pixel data of the digital image (e.g., image 202b) of the absorbent article or the portion of the absorbent article or portion of skin. Additionally, or alternatively, the individual-specific biological prediction value may be based on the position of the individual (e.g., which may be depicted within a given digital image). In various aspects, the individual-specific biological prediction value comprises one or more outputs, such as predictive scores, classifications, or other values, indicating or otherwise corresponding to stool or urine consistency, color, presence of blood, and/or amount). Additionally, or alternatively, the individual-specific biological prediction value may comprise a prediction of a leakage and/or blowout, e.g., where urine or stool residue leaks or comes out of an absorbent article.

In various aspects, the individual-specific biological prediction value may comprise a multiple of, or a set of, predictive scores, classifications, or other values indicative of the pixel data within the digital image of the absorbent article or the portion of the absorbent article. Such scores may comprise individual scores regarding stool based scores (e.g., stool leaker score) and/or urine based scores (e.g., urine amount, etc.), where such scores are determined based on specific pixel values (e.g., darker pixels represent stool values, yellow or lighter pixels represent urine values, and whiter pixels represent absorbent article or product values). It is to be understood, however, that scores or analysis for other biological features are contemplated herein. For example, scores or analysis for other biological features may also be determined, where biological features may include, by way of non-limiting example, e.g., blood, bodily discharge, such as feminine discharge (e.g., menstrual discharges), biologicals feature detected on the topsheet, skin, or any other biological feature(s) described herein or otherwise. Additionally, or alternatively, the predictive scores, classifications, or other values may correspond to mixed diapers with urine and BM, and/or other biological features. Still further, the predictive scores, classifications, or other values may correspond to non-homogenous stool and/or urine where different parts of the stool can be identified within the pixel data. Still further, the predictive scores, classifications, or other values can be based on other input from a user beyond the pixel data, including, for example, information regarding answers to user survey questions that could be used in combination with the pixel data to create an individual-specific biological prediction value. Such additional information may be used to further train a biological based learning model to output the individual-specific biological prediction value. In general, such "scores" or other values can indicate the prediction of the severity, risk, number of locations of a leak, or as otherwise described herein.

Still further, in various aspects, such scores or values (e.g., individual-specific biological prediction value) may comprise numerical values and/or thresholds, wherein detection of an indication of a given score or factor (e.g., watery with curds), or other such values, such as amount, color, etc., depends on whether or not a given score or value (e.g., individual-specific biological prediction value) is above, at, and/or below a given threshold. This may prevent the biological digital imaging methods and systems as described herein from generating false positives and/or negatives as output. Such score and/or thresholds may be based on literature references, medical preference standards, and the like.

For example, in various aspects, a biological feature identifiable within pixel data of an image (e.g., image 202b) may comprise a stool or a stool residue, and, in such aspects, the individual-specific biological prediction value may comprise at least one of: (1) a stool leakage score (e.g., predicting a possibility of a leak); (2) a stool normalcy score (e.g., providing a normalized value); (3) a stool color score (e.g., indicating a color of the stool for predictive purposes); (4) a stool consistency score (e.g., indicating a consistency type of a stool); (5) a stool and absorbent article product consistency score (e.g., indicating a value of consistency for a stool and a given product, such as an absorbent article); (6) a stool amount score (e.g., indicating a value of an amount of the stool in an absorbent article); or (7) a stool health score (e.g., indicating an aspect of the user's health). Any of these scores may comprise a "transformed value," such as a weighted single value, that accounts for multiple parameters and/or scores. Additionally, or alternatively, a score may be determined based on how many standard deviations a given image, and/or related digital pixel(s) therein, is from a central value of an overall distribution of a feature vector corresponding to a biological feature with a training set of digital images.

Such score(s) may be determined by imaging app 108 and/or biological based learning model as described herein. Still further, for example, in some aspects, an individual-specific biological prediction value may comprise a score, indicator, prediction, classification, or scale based value assessing whether a baby's "pee" and/or "poo" are normal (e.g., color and/or consistency). For example, in various aspects, an individual-specific biological prediction value may comprise or indicate a stool scale as described by Gustin et al., "*Characterizing Exclusively Breastfed Infant Stool via a Novel Infant Stool Scale*," Journal of Parental and Enteral Nutrition (2018), the entirety of which is incorporated by reference herein. Such individual-specific biological prediction value may allow a user (e.g., parent) to determine whether to contact a doctor (e.g., pediatrician). Such scores can be used for stool forecasting. For example, a stool and/or absorbent article product consistency score can identify the dewatering nature of the absorbent article could affect the stool consistency appearance. Such scores or values can aid a user to identify when to expect an infant's next bowel movement without undressing an infant. Further, such scores or values can aid a user to determine whether expect a blowout or leak within a certain period of time (e.g., next 12 hours). Still further, such scores can aid a user to determine or identify the optimal absorbent article change timing to prevent blowouts or leaks.

In similar aspects, a biological feature identifiable within pixel data of an image (e.g., image 202b) may comprise a biological feature that comprises urine or a urine stain, and, in such aspects, the individual-specific biological prediction value may comprise at least one of: (1) a urine health score (e.g., identifying or defining health of the individual based on urine identified in an absorbent article and/or indicating an aspect of the user's health); (2) a urine color score (e.g., defining a color or color type based on the urine); (3) a urine and absorbent article product color score (e.g., indicating a urine type and a given product, such as an absorbent article, and effectiveness thereof); or (4) a urine leakage score (e.g., indicating a value of urine leakage or predictive probability of a urine leak occurring). Such scores or values may be determined by imaging app 108 and/or biological based learning model as described herein. In some aspects, urine color could be adapted or augmented based on a urine dye, colorant, or chemical agent, which may be applied to an absorbent article during or after manufacture. In such aspects, the individual-specific biological prediction value may be based on such color or otherwise product augmentations. Urine scores, at a minimum, may be sufficient to distinguish regions containing stool from regions containing only urine.

In various aspects, the individual-specific biological prediction value may indicate a probability, value, and/or score of the individual experiencing a health issue. Such values may be used to determine or detect potential health, convenience, and/or comfort issues such as dehydration, allergies, and the like, and with enough accuracy to advise when to contact a pediatrician or take other actions, such as preventative or corrective measures. Such score or value may also be provided to a pediatrician or other health professional to help a user prepare for a visit, which may include a personalized timeline for an infant (based on the individual-specific biological prediction value) designed to answer questions a pediatrician or other health professional may ask). The system of the present disclosure may additionally include a means to send, or otherwise provide access to, the images, analyses, or recommendations to a user's physician, or other third party, upon the request of the user or caregiver. For example, data related to the user's health may be provided to a physician via a cloud-based system, or a researcher may be granted access to data related to the functionality of the article and/or the properties of the stool, urine, menses, etc. As a further example, an app (as described herein for FIG. 9) may be configured to send images a doctor and/or third party to provide a telemedicine implementation, where the doctor having receiving app/link can access an individual-specific biological prediction value, and where private data can be secured requiring user sharing permissions. The app may comprise telemedicine app, and may be presented in a way a doctor can interpret. In some aspects, a user can select which images or portions of images to use and/or submit and may pinpoint parts of images to use and/or submit.

As a further example, an individual-specific biological prediction value may be used as an indicator as to when to change absorbent articles based on stool, urine, or other such indicators, driving higher frequency of absorbent article changes to mitigate health, convenience, and/or comfort issues with improved efficacy. For example, an individual-specific biological prediction value may be used to assess whether an infant's or other individual's stool is particularly prone to irritate a wearer (e.g., high amount) to help prevent absorbent article rash. In addition, a user may provide input on a condition of the skin in combination with the individual-specific biological prediction value, in order to alter, adjust, or update the individual-specific biological prediction value. In similar aspects, an individual-specific biological prediction value may be used to stop the progression of absorbent article rash once signs of redness have appeared. In similar aspects, the individual-specific biological prediction value may be used to identify products and/or care routines to prevent absorbent article rash. Images, and analyses thereof, may also be used to more accurately provide skin care recommendations to users or caregivers.

As still further examples, an individual-specific biological prediction value may be used to detect food allergies and feeding issues, such as detection of potential food intolerances or allergies, and to determine whether an infant is eating and/or drinking enough (even when breastfeeding) to respective health issues corresponding to biological features as detected within pixel data of an absorbent article and/or absorbent article portion.

FIGS. 5A-5D illustrate an example biological based learning model, in accordance with various aspects disclosed herein. A biological based learning model may be an artificial intelligence based model, such as a machine learning based model. Biological based learning model may be implemented as part of or communicatively coupled to imaging app 108 and at computing device 111c1 and/or server(s) 102, where all or portions of biological based learning model are executed at or across computing device 111c1 and/or servers 102.

In various aspects, analyzing of a digital image (e.g., 202b) comprises inputting the digital image into the biological based learning model electronically accessible by the imaging app (e.g., imaging app 108). The biological based learning model is trained with pixel data of a plurality of training images depicting absorbent articles or portions of absorbent articles (e.g., 202a and/or 202c). The biological based learning model configured to output one or more biological prediction values (e.g., as described for FIG. 4 or otherwise herein) corresponding to one or more biological features of the pixel data of the plurality of training images depicting the absorbent articles or the portions of absorbent articles.

In various aspects, a biological based learning model comprises an artificial intelligence (AI) based model trained with at least one AI algorithm. Training of the biological based learning model involves image analysis of the training images to configure weights of the biological based learning model, and its underlying algorithm (e.g., machine learning or artificial intelligence algorithm) used to predict and/or classify future images. For example, in various aspects herein, generation of the biological based learning model involves training the biological based learning model with the plurality of training images, where each of the training images comprise pixel data and depict absorbent articles or portions of absorbent articles as described for FIG. 2. In some aspects, one or more processors of a server or a cloud-based computing platform (e.g., imaging server(s) 102) may receive the plurality of training images of the plurality of individuals via a computer network (e.g., computer network 120). In such aspects, the server and/or the cloud-based computing platform may train the biological based learning model with the pixel data of the plurality of training images.

In various aspects, a machine learning imaging model, as described herein (e.g., biological based learning model), may be trained using a supervised or unsupervised machine learning program or algorithm. The machine learning program or algorithm may employ a neural network, which may be a convolutional neural network, a deep learning neural network, or a combined learning module or program that learns in two or more features or feature datasets (e.g., pixel data) in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some aspects, the artificial intelligence and/or machine learning based algorithms may be included as a library or package executed on imaging server(s) 102. For example, libraries may include the TENSORFLOW based library, the PYTORCH library, and/or the SCIKIT-LEARN Python library.

Machine learning may involve identifying and recognizing patterns in existing data (such as identifying biological features depicted within the pixel data of the digital image of the absorbent article or the portion of the absorbent article and/or skin as described herein) in order to facilitate making predictions or identification for subsequent data (such as using the model on new pixel data of a new image in order to determine or generate an individual-specific biological prediction value corresponding to at least one of: (a) the absorbent article; (b) the portion of the absorbent article; or (c) an individual associated with the absorbent article or portion of the absorbent article).

Machine learning model(s), such as the biological based learning model described herein for some aspects, may be created and trained based upon example data (e.g., "training data" and related pixel data) inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on a server, computing device, or otherwise processor(s) as described herein, to predict or classify, based on the discovered rules, relationships, or model, an expected output, score, or value.

In unsupervised machine learning, the server, computing device, or otherwise processor(s), may be required to find its own structure in unlabeled example inputs, where, for example multiple training iterations are executed by the server, computing device, or other processor(s) to train multiple generations of models until a satisfactory model, e.g., a model that provides sufficient prediction accuracy when given test level or production level data or inputs, is generated.

Supervised learning and/or unsupervised machine learning may also comprise retraining, relearning, or otherwise updating models with new, or different, information, which may include information received, ingested, generated, or otherwise used over time, and/or which may include information from difference sources, questionnaires, user feedback, etc. The disclosures herein may use one or both of such supervised or unsupervised machine learning techniques.

Various types of training images and/or training techniques may be used to train, and otherwise determine output and/or execution of an AI model, such as a biological based learning model as described herein. In various aspects, image analysis may include training a machine learning based model (e.g., the biological based learning model) on pixel data of images depicting an absorbent article or a portion of the absorbent article and/or skin. Additionally, or alternatively, image analysis may include using a machine learning imaging model, as previously trained, to determine, based on the pixel data (e.g., including their L*, a*, and b* values and/or RGB values) one or more images of the absorbent article or the portion of the absorbent article. The weights of the model may be trained via analysis of various L*a*b* and/or RGB values of individual pixels of a given image. For example, dark or low L* values (e.g., a pixel with an L* value less than 50) may indicate regions of an image where a stool is present or where absorbent article edges are present. Likewise, a slightly lighter L* values (e.g., a pixel with an L* value greater than 50) may indicate the presence of urine in an absorbent article or the portion of the absorbent article. Still further, high and/or low a* and/or b* values may indicate areas of an absorbent article or portion of the absorbent article containing more or less stool and/or urine. Together, when a pixel having stool and/or urine, or other biological feature values, such as L*a*b* or RGB values is positioned within a given image, or is otherwise surrounded by, a group or set of pixels having typical absorbent article toned colors (e.g., white or light toned colors) or skin tones (tones appropriate for a specific user), then a biological based learning model can determine an individual-specific biological prediction value, as identified within the given image. In this way, pixel data (e.g., detailing a biological feature depicted within the pixel data of the digital image of the absorbent article or the portion of the absorbent article) of 10,000s training images may be used to train or use a machine learning imaging model to determine an individual-specific biological prediction value.

In various aspects, the plurality of training images (e.g., 202a, 202b, and/or 202c) depicting absorbent articles or portions of absorbent articles and/or portions of skin comprises digital images of absorbent articles or portions of absorbent articles and/or skin as captured and submitted by different individuals. The images as captured may be unprocessed and/or untrimmed (e.g., "wild images") as captured by users operating computing devices 111c1-111c3 and/or 112c1-112c3, and may include mobile devices, such as mobile phones, and/or other imaging devices such as a LUMI device and its related camera. Such "wild" images may include one or more of the plurality of images captured at multiple angles or perspectives depicting an absorbent article or a portion of an absorbent article. Additionally, or alternatively, the images, as submitted, may be cropped or uncropped. For example, in some aspects, one or more of the plurality of training images may comprise at least one cropped image depicting an absorbent article or a portion of an absorbent article.

In some aspects, high quality or non-wild images may be used to train a biological based learning model. In such aspects, training images may comprise absorbent articles, having biological features, prepositioned or arranged with indicators (color, dimensions, position, region of interest) to improve the accuracy to train the biological based learning model. It is to be understood, however, that such high quality or non-wild images are not necessarily required, and that wild captured images are sufficient for training purposes.

In still further aspects, the plurality of training images (e.g., any one or more of images 202a, 202b, and/or 202c) depicting absorbent articles or portions of absorbent articles and/or skin may comprise simulated images of absorbent articles or portions of absorbent articles and/or skin. Such simulated images may comprise images of absorbent articles that appear to have biological features (e.g., stool residue or urine). Such simulations may be created by adding pixel data to an image digitally, such as via a digital editor (e.g., PHOTOSHOP editor or other graphical editor), automatically via computing instructions, or manually, e.g., adding fake effects (e.g., paint, etc.) to physical absorbent articles and capturing images of such absorbent articles.

In yet further aspects, the plurality of training images depicting absorbent articles or portions of absorbent articles may comprise digital images depicting different sizes or types of absorbent articles. The different absorbent articles or portions of absorbent articles may correspond to different brands and/or types of absorbent articles.

In yet further aspects, the plurality of training images depicting absorbent articles or portions of absorbent articles and/or portions of skin may comprise digital images depicting different skin tones.

In still further aspects, the plurality of training images depicting absorbent articles or portions of absorbent articles and/or skin may comprise one or more sets of series of digital images. Each series of digital images may depict a series of digital images of absorbent articles or portions of absorbent articles and/or skin of respective individuals over respective periods of time. In various aspects, the one or more sets of series of digital images may be used for tracking trends, such as tracking how much (e.g., an amount over time) an infant is defecating and/or urinating. Such series of images may be used to train biological based learning model to output values regarding predicted leaks, blowouts, color, consistency, amount, timing based. For example, a series of three absorbent article images (e.g., representing three absorbent article changes) may be used to predict the next day's outcome, such as leaks, blowouts, etc. Additionally, or alternatively, a series of three days of images may be used to predict the next week's outcome, such as leaks, blowouts, etc. A series of images may alternatively be used to generate information to users or caregivers related to trends and/or may be analyzed via any statistical process control techniques, such as control charting, as known in the art. This may enable the caregiver or user or physician to define and assess any changes to determine if an intervention (such as an absorbent article size change, medication, etc.) is warranted.

Training a biological based learning model on a series of digital images involves capturing images over time. For example, a digital image of the absorbent article or the portion of the absorbent article may be recorded, in one or more memories (e.g., memories 106) communicatively coupled to the one or more processors (e.g., processors 104), as part of an individual-specific series of digital images of the absorbent article or the portion of the absorbent article as captured at a first time. A second image of a second absorbent article or a portion of a second absorbent article of the individual may further be recorded, in the one or more memories (e.g., memories 106), and as part of the individual-specific series of digital images. The second image may comprise a digital image as captured by a digital camera (e.g., 111c1c) at a second time. The second image may comprise pixel data having a second biological feature (e.g., second indication of urine and/or stool) as depicted within the second image of the second absorbent article or the portion of the second absorbent article. The imaging app (e.g., imaging app 108) may generate, by the biological based learning model, an individual-specific biological prediction value based on the biological feature depicted within the pixel data of the digital image and further based on the second biological feature as depicted within the second image of the second absorbent article or the portion of the second absorbent article. In some aspects, the second image may be aligned, resized, to match that of the first image to improve processing of the two images.

In additional aspects, the second image may comprise an image of a different product and/or picture of the individual. In such aspects, an individual-specific biological prediction value, informatics, or otherwise prediction may be generated or based on a collection of images (e.g., the first image and the second image), combinations therefore, and/or differences and/or similarities depicted in the pixel data therein.

In still further aspects, images (e.g., the first image and the second image) may be compared over time to determine a commonality or pattern of occurrences such as when a urine or BM event occurred, e.g., 30 minute within feeding, waking up from nap, etc.). Such information may be stored in memory and/or a database and used for training AI model(s) as described herein. In still further aspects, a user (e.g., a person who wears, uses the product, a caregiver, or any third party person given access to the data), can categorize searchable images in a database by reviewing images (e.g., depicting urine, BM, leaks), and other data, such as whether the user is on antibiotics, statistics, analysis, same or different categories of information, grouping by color, similar color in database to new image to compare and find similar comparable images. Such data may also be used for training AI model(s) as described herein In still further aspects, analysis between images over time (e.g., the first image and the second image) may be used to generate control charts, for example, based on a population of images, time sequenced or not, which may be used to gather relevant statistics, and apply statistical techniques to it such as control charting, normalization, and/or when there is a breakout of range, etc.

In additional aspects, a biological based learning model may further be trained with product metrics of the absorbent articles or portions of absorbent articles as depicted in the plurality of training images or as provided as data input. Non-limiting examples of product metrics may include additional image information and/or textual or other data information. For example, in some aspects, additional data information may comprise information generated or provided by a sensor of an absorbent article as depicted in a given image (e.g., any one or more of images 202*a*, 202*b*, and/or 202*c*). The sensor could detect urine, stool, wetness, or other such measurements associated with a biological waste and/or an absorbent article and which could be input as training data in addition to the image data. Additionally, or alternatively, data on the activity (sleep, feeding, etc.) may be provided via a separate sensor system, such as the LUMI sensor, attached, for example, to the wearable article. User position or activity data may augment the system's predictive or analytical functionality.

Additionally, or alternatively, information such as the topsheet material of the absorbent article, the brand and/or size of the absorbent article, or a wipe used with respect to cleaning the absorbent article and/or individual, etc., each of which could correspond to an absorbent article as depicted in a given image (e.g., any one or more of images 202*a*, 202*b*, and/or 202*c*) could be input as training data in addition to the image data.

Additionally, or alternatively, a biological based learning model may further be trained with reference data of one or more respective individuals corresponding to the absorbent articles or portions of absorbent articles and/or skin as depicted in the plurality of training images. Such reference data may include associated attributes with an individual (e.g., an infant), such as health data or other data related to the individual. Such data could further include age, time of day, time of eating and/or drinking, what was ate or drunk, whether or not the individual is teething, recent physical activity, emotional state (e.g., fussiness), size of absorbent article, weight or bodily dimensions of user, skin tone, medicines taken by the individual and other attributes such as diet, feeding schedule, mobility, or stage of the individual (walking, crawling, etc.), which can be especially relevant for blowout prediction.

Accordingly, the product metrics and/or reference data may be used to enhance the predictive quality of the biological based learning models. In such aspects, one or more biological features of the pixel data of a plurality of training images depicting absorbent articles or portions of absorbent articles comprise positive attribute(s) or negative attribute(s) corresponding to one or more of (1) the product metrics of the absorbent articles or portions of absorbent articles or (2) the reference data of one or more respective individuals. Examples of positive attributes of product metrics include "dry indicator" data from a sensor of an absorbent article and/or a high quality topsheet material of an absorbent article. Negative attributes of product metrics may include "wet indicator" data of an absorbent article and/or a poor quality topsheet material of an absorbent article. Still further, examples of positive reference data of an individual may comprise an indication of a good diet and/or an indication of a correct size absorbent article for a specific individual. Examples of negative reference data may include an indication of a poor diet and/or an indication of an incorrect size absorbent article of a specific individual.

In such aspects, biological digital imaging method 400 may further comprise receiving product metric data of the absorbent article or the portion of the absorbent article of the individual, and receiving reference data of the individual, e.g., via computer network 120. The biological based learning model may then generate individual-specific biological prediction value(s) based on the product metric data of the absorbent article or the portion of the absorbent article of the individual, the reference data of the individual, and the biological feature that comprises at least one of the positive attribute or the negative attribute corresponding to one or more the product metric data or the reference data of the individual.

With reference to FIGS. 5A-5D, an example biological based learning model may comprise an ensemble model comprising multiple AI models or sub-models that are configured to operate together. Additionally, or alternatively, a biological based learning model may comprise a transfer learning based set of AI models, where transfer learning comprises transferring knowledge from one model to another (e.g., outputs of one model are used as inputs to another model). Using transfer learning, a particular task (e.g., identification, classification, and/or or prediction) may be solved using full or part of an already pre-trained model on a different task. FIGS. 5A-5D illustrate an ensemble AI model and/or transfer learning based AI model, which may comprise a biological based learning model. It is to be understood, however, that other AI models (not requiring ensemble based learning or transfer learning based learning) may be used.

The aspects as described for FIGS. 5A-5D comprise a quick labeling algorithm (unsupervised semantic segmentation) that is based on a winner-takes-all scheme in which pixels representing similar visual features of stimuli are clustered. An implementation of this approach resulted in 500 perfectly masked images for training the final semantic segmentation algorithm. To detect the region of interest (ROI), the U-Net neural network architecture with only 4 contracting and 4 expanding blocks was trained on the 500 masked images (in addition to the augmented images using horizontal and vertical flipping, −5/5 degree rotations, random cropping, random scale, and slightly random contrast change) to detect the absorbent article pad area. All of the 699 test images were segmented (average 93% IOU) by this algorithm (greater than 80% IOU is the target performance for this step). In addition, 1199 (80-20 train/dev split) ROI images (in addition to the augmented images using horizontal and vertical flipping, −5/5 degree rotations, random cropping, random scale, and slightly random contrast change) were used to train and evaluate the MobileNet.V2 NN architecture using the transfer learning approach. The trained MobileNet.V2 classifies BM into 6 consistencies and 3 amounts. This consistency and amount classifiers showed 91% accuracy (99.8 NDCG_Avg) and 93% accuracy (99.1 NDCG_Avg) on the test set. The last layer of this architecture can be extended to detect other properties of the stool such as shininess, blood in stool, and the like. Each of these aspects are further described with respect to FIGS. 5A-5D.

Figure 5A:
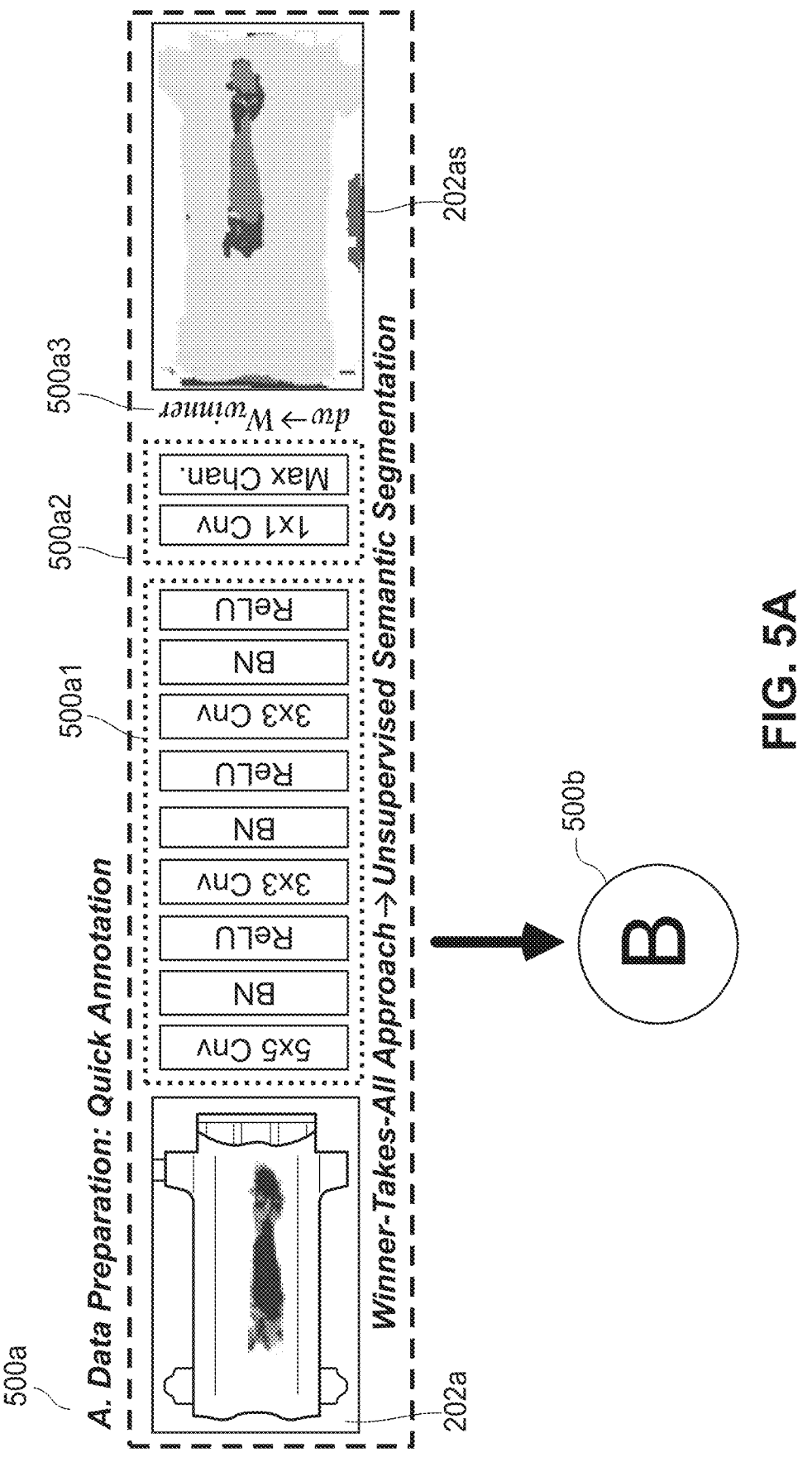
FIG. 5A illustrates an example biological based learning model, in accordance with various aspects disclosed herein.

FIG. 5A illustrates a biological based learning model, in accordance with various aspects disclosed herein. In block 500a of FIG. 5A, data is prepared where training images (e.g., image 202a) may be selected or arranged for determining a biological based learning model based on a winner-takes-all training and/or learning approach. A winner-takes-all training and/or learning approach, as illustrated for FIG. 5A, involves a set of neural networks (e.g., recurrent neural networks) that compete to determine a highest weighted model input node. The input node that has the greatest impact on the model's output (e.g., the greatest increase in prediction or classification) is chosen as the "winning" node. Generally, in order to determine the winning node, output nodes in the network mutually inhibit each other, while simultaneously activating themselves through reflexive connections. After some time, only one node (i.e., a neuron of a competing model) in the output layer will be active, namely the one corresponding to the strongest input (e.g., the winning input node). Thus, the network uses nonlinear inhibition to pick out the largest of a set of inputs. In many practical cases, there is not only a single node or neuron which becomes the only active one but there are exactly k neurons which become active for a fixed number k. This principle is referred to as k-winners-takes-all. The biological based learning model described herein may comprise or use either a single winner-takes-all approach or a k-winners-takes-all approach.

Here, the winner-takes-all training and/or learning approach is used to determine an optimal model (e.g., biological based learning model) for performing unsupervised semantic segmentation. Unsupervised semantic segmentation refers to models that learn to segment each image (i.e., cluster the pixels into their ground truth classes) without seeing the ground truth labels.

In the example of FIG. 5A, one or more input images (e.g., training images), such as image 202a, etc., are fed into one or more winner-take-all networks implementing a winner-takes-all training and/or learning approach or scheme as discussed above. The winner-take-all networks determine one or more optimal nodes (neurons) of one or more unsupervised semantic segmentation models and/or configurations or permutations of unsupervised semantic segmentation model(s). The various unsupervised semantic segmentation model(s), as utilized during the winner-takes-all training and/or learning approach, may comprise one or more convolutional neural network (CNN) based model(s) or other artificial based models either alone or in sequence. For example, as shown with respect to FIG. 5A, a plurality of CNN models 5051a1 having various filters (i.e., kernels or feature detectors) (e.g., shown as 5×5 Cnv, 3×3 Cnv, and 1×1 Cnv) are applied to images of absorbent articles or portion of an absorbent articles (e.g., image 202a). Batch normalization (BN) may be applied for each of the CNN models to train the various neurons (especially in deep neural networks) of the CNN based model(s) by standardizing inputs to a layer for each mini-batch. This can have the effect of stabilizing the learning process and dramatically reducing the number of training epochs required to train deep networks. A non-linear activation layer (e.g., Rectified Linear Unit (RELU) may be applied to normalize the output of the CNN model, e.g., e.g., to provide standardized predictive scores as output a given CNN model. As shown with respect to FIG. 5A, a 1×1 convolutional layer can be used for channel-wise pooling (maximum channel), or otherwise a feature map pooling or a projection layer, that is used for dimensionality reduction, decreasing the number of feature maps required by the CNN models 5051a1 while retaining their salient features.

Once trained or otherwise generated, the unsupervised semantic segmentation model(s), as determined by the winner-takes-all training and/or learning approach or scheme as discussed above, can then be used to generate segmented based images, e.g., segmented image 202as, based on input images, e.g., image 202a. Segmented based images can then be used to determine a region of interest (ROI) of an image for further analysis as further described for FIGS. 5B-5D.

Figure 5B:
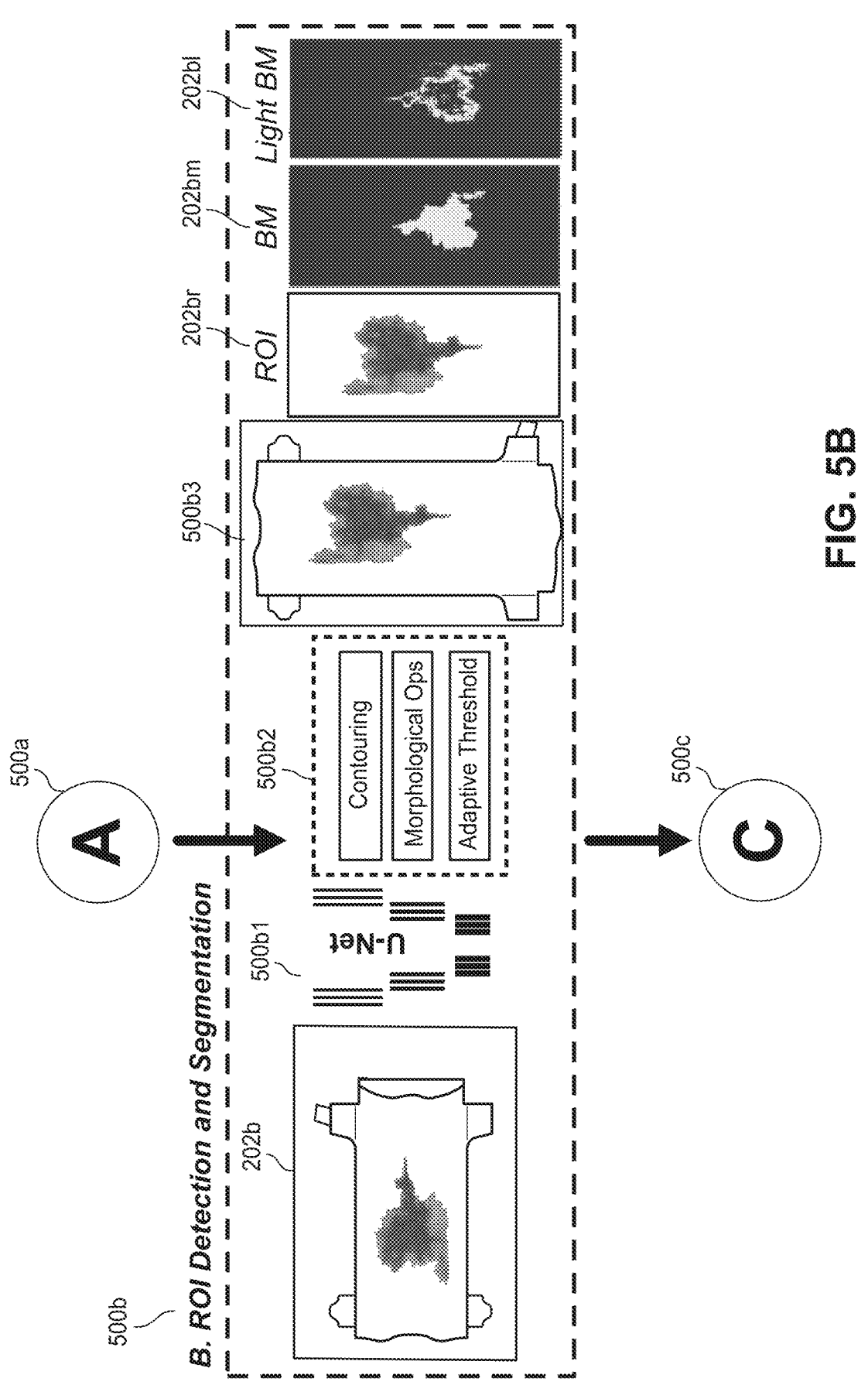
FIG. 5B further illustrates the biological based learning model of FIG. 5A, in accordance with various aspects disclosed herein.

FIG. 5B further illustrates the biological based learning model of FIG. 5A, in accordance with various aspects disclosed herein. In block 500b of FIG. 5B, the biological based learning model is configured to automatically segment a region of interest (ROI) of a digital image (e.g., image 202b) comprising the biological feature for biological analysis based on the pixel data of the digital image. The digital image may be a different image (e.g., 202b) than the image(s) (e.g., image 202a) used to train the model as described for FIG. 5A. The image (e.g., image 202b) may be processed or analyzed to automatically segment the region of interest of the absorbent article or the portion of the absorbent article and/or skin for biological analysis based on pixel data recognized by artificial intelligence algorithms. Such analysis includes determining the ROI that includes the biological features within the image and/or filtering out non-areas of interest (e.g., clean areas of an absorbent article.). This can further include processing and/or further segmentation of image, for example, to determine stain indicative parameters regarding size, location, color, etc., which can be used to make machine learning classifications and/or predictions, and accounting for the type of absorbent article, smoothing, etc.

For example, with respect to block 500b of FIG. 5B, unsupervised semantic segmentation model(s) may form, be part of, or may be fed into a U-Net model 500b1. Generally, a U-Net model (e.g., U-Net model 500b1) comprises or is based on a fully convolutional network and its architecture is modified and extended to work with fewer training images and to yield more precise segmentations. A U-Net model consists of a contracting path and an expansive path of kernels, which gives it a "u-shaped" architecture. The contracting path is a typical convolutional network that consists of repeated application of convolutions, each of which may be followed by a rectified linear unit (ReLU) and a max pooling operation. During the contraction, the spatial information is reduced while feature information is increased. The expansive pathway combines the feature and spatial information through a sequence of up-convolutions and concatenations with high-resolution features from the contracting path. The high-resolution features can be used to generate a high-quality segmented images, channels, or layers, such as bowel movement (BM) layer 202bm or light BM layer 202bl. As used herein, BM, stool, and "poo" refer to the same biological waste.

At block 500b2 one or more image manipulation techniques may be applied to an image (e.g., image 202b) in order to enhance ROI detection and/or identification and/or otherwise segmentation for increase model accuracy. Such image manipulation techniques may comprise contouring, morphological operations, and/or adaptive thresholding. These techniques may be used to detect edges and contours, and reduce graphical noise, thereby providing an impact on the accuracy of feature detection (e.g., biological features). For example, removing noises and controlling the intensity of pixel values can help a model focus on important features details and get higher accuracy.

Generally, contouring can be used to determine the ROI of an image, where a contour of an image comprises a contour line or series or set of pixels that indicates a curved line representing the boundary of the same values or the same intensity.

Generally, thresholding comprises transforming an image into a binary based image. A threshold value and max value can be set and pixel values can be converted accordingly. An enhanced approach, adaptive thresholding, can also be used to apply different thresholds for each part of the image. With adaptive thresholding, a threshold value, within the range of pixel values or luminance values or intensities of the image, can be used to enhance thresholding for images with varying illumination.

A morphological transformation may also be applied to an image. Morphological transformations can include manipulation of figures within images by filtering, such as erosion (e.g., shrinking figures and/or converting figures within images to greyscale) and dilation (e.g., making objects expand, typically opposite to that of erosion).

The U-Net model 500b1 and/or image manipulation techniques 500b2 may be used to process image 202b (e.g., by segmentation, contouring, morphology operations, adaptive thresholding, etc.) to generate post-processing image 500b3. Post-processing image 503b may be used to generate ROI image 202br, which comprises an ROI of image 202b and/or define layers or channels defining an amount and/or consistency of stool or urine (e.g., bowel movement (BM) layer 202bm or light BM layer 202bl) of the image. Post-processing image 500b3, and each of the bowel movement (BM) 202bm layer or light BM 202bl layer may be used by models of FIG. 5C to determine or detect color, consistency, and amount of biological features within the image of the absorbent article or absorbent article portion (e.g., within image 202b).

Figure 5C:
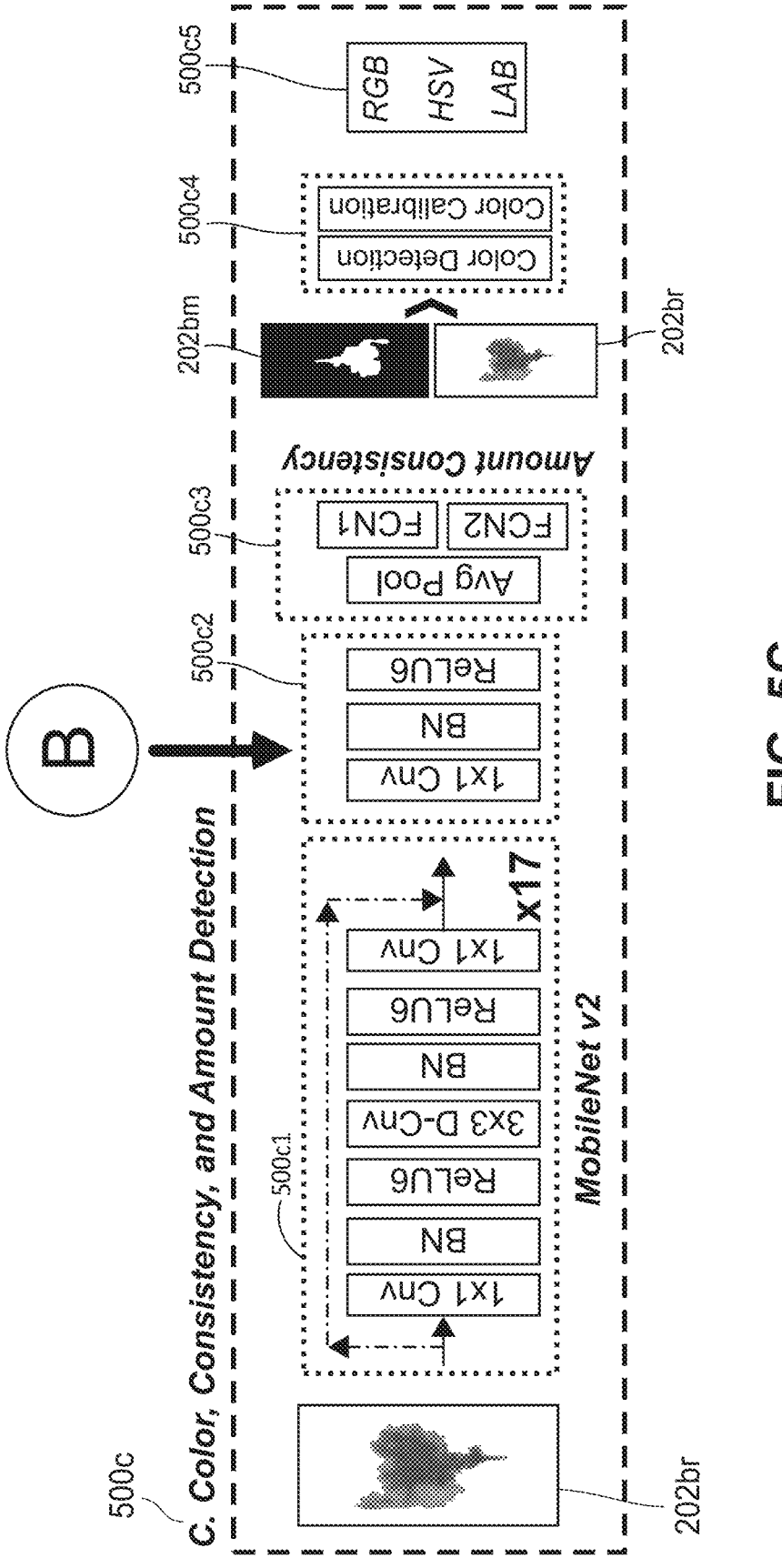
FIG. 5C further illustrates the biological based learning model of FIGS. 5A and 5B, in accordance with various aspects disclosed herein.

FIG. 5C further illustrates the biological based learning model of FIGS. 5A and 5B, in accordance with various aspects disclosed herein. In block 500c of FIG. 5C, attributes, such as color, consistency, and/or amount, corresponding to the biological feature(s) detected within an image (e.g., image 202b) are determined. In the example of FIG. 5C, a MobileNetv2 model 500c1 is shown and described, however it is to be understood that other AI models, including other versions of Mobile nets may also be used. MobileNetv2 model 500c1 comprises a MobileNetV2 model which is a convolutional neural network architecture configured for performance on a mobile device (e.g., computing device 111c1). Generally, a MobileNetV2 is based on an inverted residual structure where residual connections are between bottleneck layers. The intermediate expansion layer uses lightweight depth-wise convolutions to filter features as a source of non-linearity. As a whole, the architecture of MobileNetV2 model contains an initial fully convolution layer with various filters (e.g., 32 filters), followed by various residual bottleneck layers (e.g., 19 residual bottleneck layers). As shown in FIG. 5C, MobileNetv2 model 500c1 comprises a first layer (e.g., 1×1 Cnv, BN, and ReLU6), a second layer comprising a depth-wise convolution (e.g., 3×3 D-Cnv, BN, and ReLU6), and a third layer 500c2, which is another 1×1 convolution (e.g., 1×1 Cnv, BN, and ReLU6). The layer may be iterated over 17 times before producing an output (although other iterations may be used).

At block 500c3, the output of the MobileNetV2 model may be used to determine amount and consistency. As shown for block 500c3, an average pooling can be applied to the pixels or channels of ROI image 202br, e.g., after having been processed by MobileNetv2 model. Average pooling involves calculating an average for each section of a feature map or a kernel for a given image (e.g., ROI image 202br). For example, a 3×3 square of a feature map (kernel) may be down sampled to the average value in the square.

Still further, at block 500c3, fully convolutional networks (FCN), such as FCN1 and FCN2, which may comprise or may be separate from the models of FIGS. 5A and/or 5B, may be used to classify and/or detect objects within an image, for example, with bounding boxes. Such FCN models may be used to determine the amount and/or consistency of biological features (e.g., urine and/or stools) within an image (e.g., ROI image 202br) of an absorbent article and/or absorbent article portion.

In addition, with respect to FIG. 5C, at block 500c5, the generated output or images (e.g., ROI of image 202b, bowel movement (BM) layer 202bm, and/or light BM layer 202bl) may be used to determine or detect color and perform color calibration for a given input image (e.g., image 202b). Color detection and color calibration 500c4 can comprise analyzing pixel data color values 500c5 (e.g., including any one or more of RGB, HSV, and/or LAB values) to determine a color of urine and/or stools (e.g., dark, lighter, brown, yellow, clear, etc.) and update models to detect health issues (e.g., such as detecting allergies, etc.), or other issues, predictions, and/or information as describe herein, based on color detected in a given image (e.g., 202b).

Figure 5D:
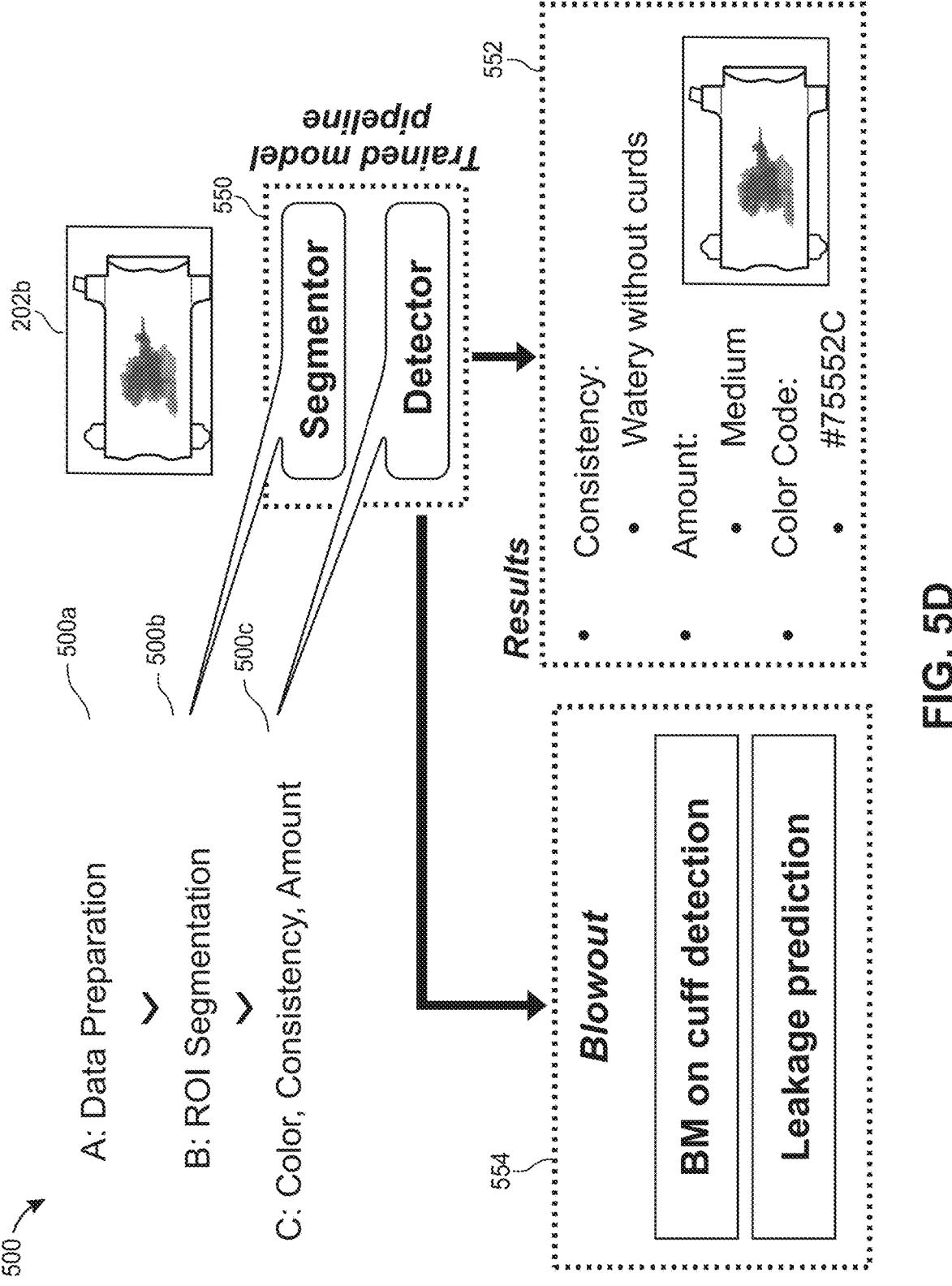
FIG. 5D further illustrates the biological based learning model of FIGS. 5A-5C, in accordance with various aspects disclosed herein.

FIG. 5D further illustrates the biological based learning model of FIGS. 5A-5C, in accordance with various aspects disclosed herein. FIG. 5D illustrates the biological based learning model of FIGS. 5A-5C as ensemble model or transfer learning type model 500 comprising a trained model pipeline 550 having multiple AI models or sub-models that are configured to operate together. As illustrated by FIG. 5D, and as described for FIGS. 5A-5C, analysis and processing (e.g., such as image processing) occurs where image data is prepared at block 500a (e.g., training of segmentation models), ROI segmentation is performed at block 500b, and color, consistency, and amounts are determined or identified at 500c. Blocks 500b and 500c comprise a trained model pipeline 550 comprising a segmentor (e.g., U-net based model) that performs segmentation as described for FIG. 5B and detector or classifier (e.g., MobileNetv2) that performs feature detection (e.g., kernel detection or filtering) as described for FIG. 5C.

As described herein, including for FIG. 4 and FIGS. 5A-5C, the output of the model may comprise a individual-specific biological prediction value, which may include predictions, classifications, and/or scores 552 for any one or more of the consistency, amount, and/or color of a given image (e.g., image 202b). For example, as shown in, FIG. 5D, the output, comprising predictions, classifications, and/or scores 552 for image 202b, comprises a consistency prediction, classification, or score of "watery without curds" indicating a consistency of the biological feature detected within the pixel data of image 202b, and an amount prediction, classification, or score of "medium" indicating an amount determined for the biological feature detected within the pixel data of image 202b, and a color code consistency prediction, classification, or score of "#75552C" defining a color detected within the pixel data of image 202b corresponding to the biological features. Other such predictions, classifications, and/or scores may also be output. By way of non-limiting example, for consistency, these may include one or more types of predictions, classifications, and/or scores corresponding to biological features including urine, and/or types of stools and classified by different consistencies, e.g., including by way of non-limiting example, watery without curds, watery with curds, mucousy, soft, pasty, and hard.

Further, by way of non-limiting example, for amount, these may include one or more types of predictions, classifications, and/or scores corresponding to biological features including none, small, medium, large, and/or blowout. Additionally, or alternatively, and as shown with respect to FIG. 5D, a blowout prediction, classification, or score 554 may further be output by ensemble model or transfer learning type model 500. Such blowout prediction, classification, or score 554 may comprise indications of whether biological features (e.g., urine, stool, or BM residue) is on a cuff or edge of an absorbent article or absorbent article portion or whether a leak is predicted for future usage of similar sized or otherwise similar absorbent articles for the given or specific individual corresponding to the absorbent article or absorbent article portion.

Further, by way of non-limiting example, for color based predictions or values, such predictions or values may include one or more types of predictions, classifications, and/or scores corresponding to biological features including any color(s) as expressed by any of the LAB, RGB, HSV, and/or other color standards or formats.

The accuracy of the ensemble model or transfer learning type model 500, as trained in accordance with the disclosure of FIGS. 5A-5D, achieves an accuracy rate of 91% for an individual-specific biological prediction value regarding consistency (e.g., consistency type of stool and/or urine detected in an absorbent article image or portion of an absorbent article image) and an accuracy rate of 93% for an individual-specific biological prediction value regarding amount (e.g., amount of stool and/or urine detected in an absorbent article image or portion of an absorbent article image). In addition the segmentor (U-net of FIG. 5B) comprises only 2 MB of data and the detector/classifier, e.g., of FIG. 5C) comprises only 8 MB data, each of which has a low impact on the memory of a computing device, which is important for mobile devices having limited storage capacity (e.g., computing device 111c1). The ensemble model or transfer learning type model 500 is deployable on a mobile device (e.g., computing device 111c1) or cloud (e.g., server(s) 102). In addition, the model ensemble model or transfer learning type model 500 has low latency on a CPU (one or more processors of a computing device), comprising 500 ms or less for analysis of each image.

Figure 6:
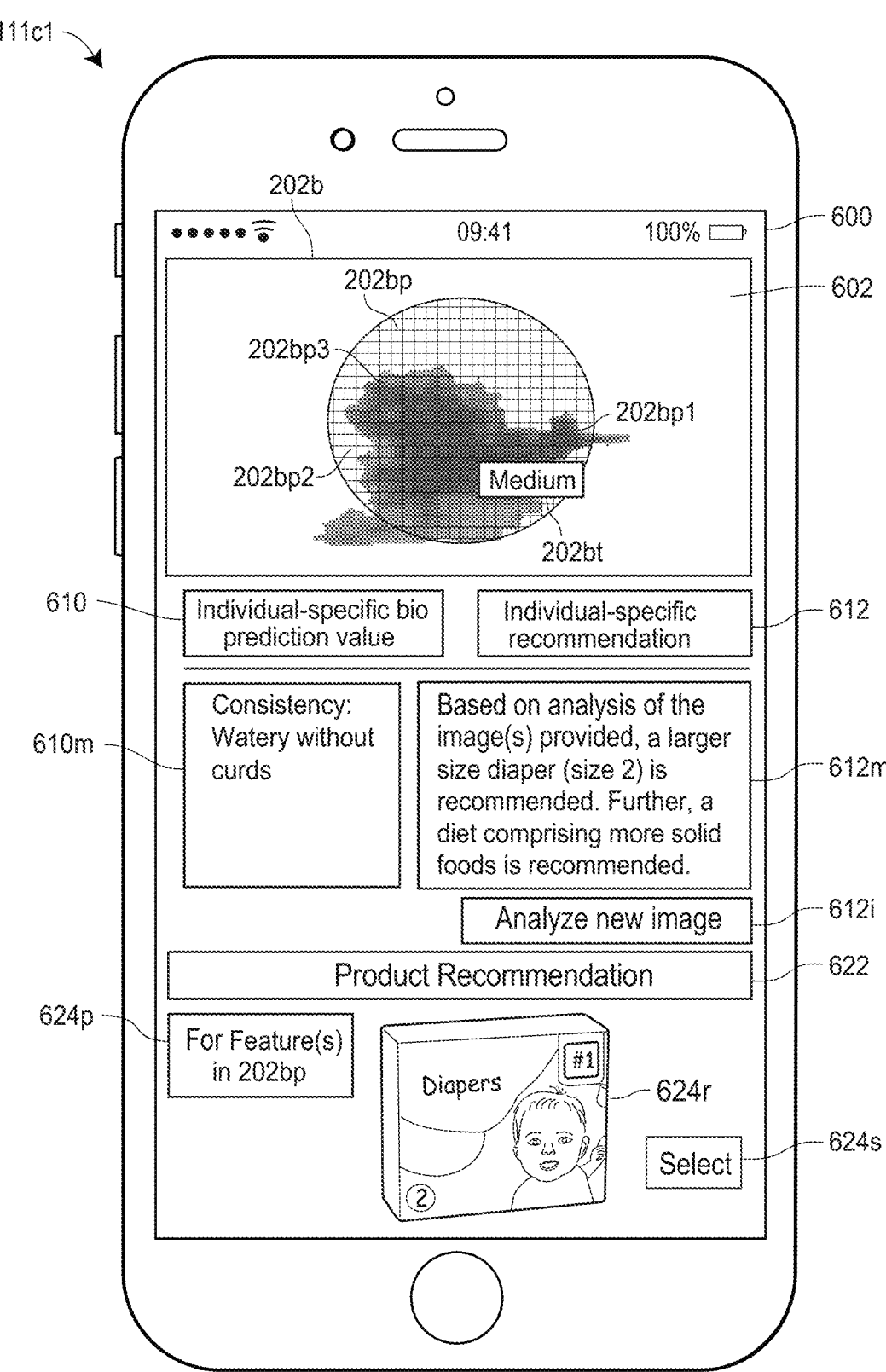
FIG. 6 illustrates an example user interface as rendered on a display screen of a user computing device in accordance with various aspects disclosed herein.

FIG. 6 illustrates an example user interface as rendered on a display screen 600 of a user computing device (e.g., user computing device 111c1) in accordance with various aspects disclosed herein. For example, as shown in the example of FIG. 6, user interface 602 may be implemented or rendered via an application (app) executing on user computing device 111c1. For example, as shown in the example of FIG. 6, user interface 602 may be implemented or rendered via a native app executing on user computing device 111c1. In the example of FIG. 6, user computing device 111c1 is a user computer device as described for FIG. 1, e.g., where 111c1 is illustrated as an APPLE iPhone that implements the APPLE iOS operating system and that has display screen 600. User computing device 111c1 may execute one or more native applications (apps) on its operating system, including, for example, an imaging app (e.g., imaging app 108) as described herein. Such native apps may be implemented or coded (e.g., as computing instructions) in a computing language (e.g., SWIFT) executable by the user computing device operating system (e.g., APPLE iOS) by the processor of user computing device 111c1. In various aspects, the imaging app (e.g., an imaging app 108) executing on a mobile devices, such as user computing device 111c1, may be referred to as an "advisor" app, designed to advise the user based on individual-specific biological prediction value (s), score(s), or otherwise as described herein with respect to biological features as depicted within pixel data.

Additionally, or alternatively, user interface 602 may be implemented or rendered via a web interface, such as via a web browser application, e.g., Safari and/or Chrome app(s), or other such web browser or the like.

In various aspects, an individual-specific recommendation may comprise a textual recommendation, an imaged based recommendation, a graphical analysis or representation of the key data or predictions, or a recommendation comprising a virtual rendering of at least the absorbent article, the portion of the absorbent article, or the individual associated with the absorbent article. Additionally, or alternatively, the individual-specific recommendation may comprise an informatic, dataview, trend, or the like, as displayable and/or renderable on a display screen. For example, as shown in the example of FIG. 6, an image based representation (e.g., image 202b), with graphical annotations (e.g., area of pixel data 202bp), textual annotations (e.g., text 202bt), and the individual-specific biological prediction value 610 and the individual-specific recommendation 612 may be transmitted, via the computer network (e.g., from an imaging server 102 and/or one or more processors) to user computing device 111c1, for rendering on display screen 600. In other aspects, no transmission to the imaging server of the user's specific image occurs, where the individual-specific biological prediction value 610 and the individual-specific recommendation 612 (and/or product specific recommendation) may instead be generated locally on an "edge" device, for example, by the imaging app 108 and/or biological based learning model executing and/or implemented on the user's mobile device (e.g., user computing device 111c1) and rendered, by a processor of the mobile device, on display screen 600 of the mobile device (e.g., user computing device 111c1).

As shown in the example of FIG. 6, user interface 602 comprises a graphical image or representation (e.g., of image 202b) of an absorbent article or portion of an absorbent article. Image 202b may comprise pixel data (e.g., pixel data 202bp) of biological features described herein. In the example of FIG. 6, a depiction or graphical representation of the image (e.g., image 202b) of the absorbent article is shown together with one or more graphics (e.g., areas of pixel data 202bp) or textual rendering(s) (e.g., text 202bt) corresponding to various features identifiable within the pixel data. For example, the area of pixel data 202bp may be annotated or overlaid on top of the image of absorbent article of image 202b) to highlight the area or feature(s) identified within the pixel data (e.g., feature data and/or raw pixel data) by the biological based learning model accessible by imaging app 108, as described for FIG. 1. In the example of FIG. 6, the area of pixel data 202bp indicates features, as defined in pixel data 202bp, including biological features (e.g., for pixels 202bp1-3), and may indicate other features shown in area of pixel data 202bp (e.g., top sheet material of the absorbent article, wrinkles, edges of the absorbent article, etc.), as described herein. In various aspects, the pixels identified as the specific features (e.g., pixels 202bp1-3), may be highlighted or otherwise annotated when rendered on display screen 600.

Textual rendering (e.g., text 202bt) indicates that the individual has an individual-specific biological prediction value of "medium" with respect to the biological features shown in the pixels (e.g., pixels 202bp1-3) of FIG. 6. The "medium" prediction or score indicates that the individual has a medium stool and/or urine amount. It is to be understood that other textual rendering types or values are contemplated herein, where textual rendering types or values may be rendered, for example, to indicate consistency, amount, color, or other values as described herein. Additionally, or alternatively, color values may be used and/or overlaid on a graphical representation shown on user interface 602 (e.g., image 202a) to indicate a degree or quality of a score, prediction, and/or classification or otherwise. The scores may be provided as raw scores, absolute scores, percentage based, scores. Additionally, or alternatively, such scores may be presented with textual or graphical indicators indicating whether or not a score is representative of positive results (good consistency, amount, colors), negative results (poor consistency, amount, colors), or acceptable results (average or acceptable consistency, amount, colors).

As shown for FIG. 6, user interface 602 may also include or render an individual-specific biological prediction value 610. In the aspect of FIG. 6, the individual-specific biological prediction value 610 comprises a message 610m designed to indicate a consistency value corresponding to the biological features detected in the image (e.g., image 202b) of the absorbent article or absorbent article portion. As shown in the example of FIG. 6, message 610m indicates that the consistency of the stool is "watery without curds."

As further shown for FIG. 6, an individual-specific recommendation 612, based on biological feature(s) identifiable within the pixel data of the digital image (e.g., image 202b) of the absorbent article or the portion of the absorbent article, may be rendered on display screen 600. Such individual-specific recommendation may comprise a recommendation or assessment specific for the individual. Additionally, or alternatively, such individual-specific recommendation, as rendered on the display screen 600, may further comprise instructions for treating the biological feature identifiable in the pixel data of the digital image of the absorbent article or the portion of the absorbent article. As shown for individual-specific recommendation 612, message 612m comprises an example individual-specific recommendation corresponding to the individual related to image 202b. Message 612m includes a specific recommendation to the user to increase absorbent article size (e.g., "a larger size absorbent article (size 2) is recommended") and to alter the individual's diet. In the example of FIG. 6, the individual-specific recommendation may be based on a determination that the individual's stool consistency ("watery without curds") is overly watery and that the absorbent article size is too small to absorb or contain all of the waste (e.g., stool and/or urine), and where the individual's (e.g., infant's) diet has reached a point where solid foods should be introduced to reduce watery stool consistency.

More generally, an individual-specific recommendation may be generated based on the individual-specific biological prediction value. The individual-specific recommendation may be designed to address the biological feature identifiable within the pixel data of the digital image of the absorbent article or the portion of the absorbent article. The individual-specific recommendation may be displayed or rendered on a computing device, such as computing device 111c1 shown for FIG. 6. In some aspects, the individual-specific recommendation may comprise a report with customized data (e.g., health data) for the individual. Such report may be used for a visit to a doctor. Additionally, or alternatively, the individual-specific recommendation, may further be provided via one or more communication channels, such as via text alerts, voice alerts, video, and/or or written instruction. The individual-specific recommendation may also comprise an augmented reality (AR) experience offered via a display screen or AR or virtual reality headset or otherwise environment. The individual-specific recommendation may also connect (e.g., via computer network 120) an individual to a doctor or specialist. The individual-specific recommendation may also initiate shipment of product(s).

For example, in some aspects, imaging app 108 may be configured to render through a field of view or display screen of an augmented reality (AR) device, a virtual representation of the individual-specific recommendation based on the biological feature identifiable within the pixel data of the digital image of the absorbent article or the portion of the absorbent article. In some aspects, the display screen may be a display screen (e.g., display screen 600) of a computing device (e.g., computing device 111c1), that can render AR and/or VR images, such as an IPHONE or ANDROID device implementing and AR and/or VR application, such as the CARDBOARD app or the like. In such aspects, the virtual representation of the individual-specific recommendation may be superimposed on one or more images of the absorbent article, portion of the absorbent article, or the individual associated with the absorbent article. For example, the AR and/or VR image may indicate how to wipe an individual's (infant's) skin after a bowel movement. Additionally, or alternatively, the virtual representation of the individual-specific recommendation may further include, provide, or render (e.g., on display screen 600) daily care practice advice, such as how to apply an absorbent article-position and tightness of an absorbent article relative to cuff, waist, crotch, fastening; how to care for skin (e.g., via wiping, cream application, etc.); how to reduce stool on skin based on stool stain, etc. to overall reduce issues like blowouts, leaks, skin redness, and the like.

With further reference to FIG. 6, an individual-specific recommendation may further comprise a product recommendation for a manufactured product. In addition, the individual-specific recommendation may be displayed on a display screen (e.g., display screen 600) with instructions for treating, mitigating, or preventing, with the manufactured product, the biological feature as depicted within the digital image (e.g., image 202b) of the absorbent article or the portion of the absorbent article. For example, message 612m recommends use of an absorbent article size 2, which may help reduce the possibility of leaks and/or blowouts (e.g., excessive urine and/or stool leakage from the absorbent article). The absorbent article size recommendation may be made based on the "medium" score (e.g., as shown for text 202bt) corresponding to the individual-specific biological prediction value based on the biological feature depicted within the pixel data (e.g., 202bp) of the digital image (e.g., 202b) of the absorbent article or the portion of the absorbent article. The product recommendation can be correlated to the identified feature within the pixel data, and the user computing device 111c1 and/or server(s) 102 can be instructed to output the product recommendation when the feature (e.g., a medium level of stool or BM residue) and/or other date (e.g., user provided data) is scored, predicted, and/or classified as determined from the individual-specific biological prediction value.

More generally, product recommendations, may include, by way of non-limiting example, a recommendation for an optimal absorbent article or absorbent article size, e.g., to prevent blowouts and/or leaks for the individual, and which may be based on the individual's diet and activity level. In addition, product recommendations may assist a user to identify optimal products based on an individual's changing skin needs (e.g., products such as absorbent articles, body wash, creams, lotions, ointments, and the like).

For example, as shown in FIG. 6, user interface 602 recommends a product (e.g., manufactured product 624*r* (e.g., absorbent article size 2)), which may be based on the individual-specific biological prediction value 610. In the example of FIG. 6, the output or analysis of image(s) (e.g. image 202*b*) of biological based learning model (e.g., as communicatively coupled to or as part of imaging app 108), e.g., individual-specific biological prediction value 610 and/ or its related values (e.g., "medium" and/or consistency: "watery without curds"), related pixel data (e.g., 202*bp*1, 202*bp*2, and/or 202*bp*3), and/or the individual-specific recommendation 612, may be used to generate or identify recommendations for corresponding product(s). Such recommendations may include products such as absorbent articles, wipes, skin creams, ointments, and the like, or as otherwise described herein, to address an individual-specific issue as detected within the pixel data by the imaging app 108 and/or biological based learning model.

In the example of FIG. 6, user interface 602 renders or provides a recommended product (e.g., manufactured product 624*r*) as determined by the imaging app 108 and/or biological based learning model and the related image analysis of image 202*b* and its pixel data and various features. In the example of FIG. 6, this is indicated and annotated (624*p*) on user interface 602.

User interface 602 may further include a selectable user interface (UI) button 624*s* to allow the user (to select for purchase or shipment the corresponding product (e.g., manufactured product 624*r*). In some aspects, selection of selectable UI button 624*s* may cause the recommended product(s) to be shipped to the user and/or may notify a third party that the individual is interested in the product(s). For example, either user computing device 111*c*1 and/or imaging server(s) 102 may initiate, based on the individual-specific biological prediction value 610 and/or the individual-specific recommendation 612, the manufactured product 624*r* (e.g., absorbent article size 2) for shipment to the user. In such aspects, the product may be packaged and shipped to the user.

In various aspects, an individual-specific recommendation, as described herein, may be rendered on the display screen in real-time or near-real time, during, or after receiving, the digital image of the absorbent article or the portion of the absorbent article. For example, with respect to FIG. 6, any one or more of graphical representations, images (e.g., image 202*a*), with graphical annotations (e.g., area of pixel data 202*bp*), textual annotations (e.g., text 202*bt*), individual-specific biological prediction value 610, individual-specific recommendation 612, and/or product recommendation 622 may be rendered (e.g., rendered locally on display screen 600) in real-time or near-real time during or after receiving, the image having the biological feature(s). In aspects where the image is analyzed by imaging server(s) 102, the image may be transmitted and analyzed in real-time or near real-time by imaging server(s) 102.

In some aspects, the user may provide a new image that may be transmitted to imaging server(s) 102 for updating, retraining, or reanalyzing by imaging app 108 and/or a biological based learning model. In other aspects, a new image that may be locally received on computing device 111*c*1 and analyzed, by imaging app 108, on the computing device 111*c*1. For example, as shown in the example of FIG. 6, the user may select selectable button 612*i* for reanalyzing (e.g., either locally at computing device 111*c*1 or remotely at imaging server(s) 102) a new image (e.g., image 202*c*). Selectable button 612*i* may cause user interface 602 to prompt the user to attach for analyzing a new image. Imaging server(s) 102 and/or a user computing device such as user computing device 111*c*1 may receive a new image comprising pixel data of the digital image of the absorbent article or the portion of the absorbent article. The new image may be captured by the imaging device. The new image (e.g., similar to image 202*b*) may comprise pixel data of at least an absorbent article or a portion of an absorbent article. The biological based learning model and/or imaging app (e.g., imaging app 108), executing on the memory of the computing device (e.g., imaging server(s) 102), may analyze the new image captured by the imaging device to determine an individual-specific biological prediction value as described herein. The computing device (e.g., imaging server(s) 102) may generate, based on a comparison of the image and the second image, a new individual-specific biological prediction value and/or a new individual-specific recommendation regarding at least one feature identifiable within the pixel data of the new image. For example, the new individual-specific biological prediction value may comprise a new graphical representation including graphics and/or text (e.g., showing a new value, e.g., "soft" referring to a soft stool, after the individual changed his or her diet). The new individual-specific biological prediction value may include additional scores, values, predictions, and/or classifications, e.g., normal diet score indicating a normal (or average) diet of the individual, based on the biological feature(s) depicted in the new image.

The user interface may also enable the user, caregiver, physician, or third party to select groups of images with a given commonality for display, analysis, or graphical representation of analyses. Commonalities for grouping may include time range, time of day, user activity (e.g., sleeping vs awake), diet, medication periods or types, consistency of stool, size of stool, absorbent article (e.g., diaper) leakage events, articles related to changes in analyzed properties, or skin health events, among others. The system may have a searchable, categorized database and storage capability to support the above functionality.

ASPECTS OF THE DISCLOSURE

The following aspects are provided as examples in accordance with the disclosure herein and are not intended to limit the scope of the disclosure.

1. A biological digital imaging method for analyzing pixel data of one or more digital images depicting absorbent articles or portions of absorbent articles, the biological digital imaging method comprising: obtaining, at one or more processors, a digital image depicting an absorbent article or a portion of an absorbent article, the digital image comprising pixel data; analyzing, by an imaging application (app) executing on the one or more processors, the digital image of the absorbent article or the portion of the absorbent article to detect a biological feature depicted within the pixel data of the digital image of the absorbent article or the portion of the absorbent article; and generating, by the imaging app, an individual-specific biological prediction value corresponding to at least one of: (a) the absorbent article; (b) the portion of the absorbent article; or (c) an individual associated with the absorbent article or portion of the absorbent article, wherein the individual-specific biological prediction value is based on the biological feature depicted within the pixel data of the digital image of the absorbent article or the portion of the absorbent article.

2. A biological digital imaging method of aspect 1, wherein the analyzing of the digital image comprises inputting the digital image into a biological based learning model electronically accessible by the imaging app, and wherein biological based learning model is trained with pixel data of a plurality of training images depicting absorbent articles or portions of absorbent articles having respective biological features depicted within the pixel data of respective training images, the biological based learning model configured to output one or more biological prediction values corresponding to one or more biological features of the pixel data of the plurality of training images depicting the absorbent articles or the portions of absorbent articles.

3. A biological digital imaging method of aspect 2, wherein the biological based learning model is configured to automatically segment a region of interest of the digital image comprising the biological feature for biological analysis based on the pixel data of the digital image.

4. The biological digital imaging method of aspect 2, wherein the plurality of training images depicting absorbent articles or portions of absorbent articles comprises digital images of absorbent articles or portions of absorbent articles as captured and submitted by different individuals.

5. The biological digital imaging method of aspect 2, wherein the plurality of training images depicting absorbent articles or portions of absorbent articles comprises simulated images of absorbent articles or portions of absorbent articles.

6. The biological digital imaging method of aspect 2, wherein the plurality of training images depicting absorbent articles or portions of absorbent articles comprises digital images depicting different sizes or types of absorbent articles.

7. The biological digital imaging method of aspect 2, wherein the plurality of training images depicting absorbent articles or portions of absorbent articles comprises one or more sets of series of digital images, each series of digital images depicting a series of digital images of absorbent articles or portions of absorbent articles of respective individuals over respective periods of time.

8. The biological digital imaging method of aspect 7, further comprising: recording, in one or more memories communicatively coupled to the one or more processors, the digital image of the absorbent article or the portion of the absorbent article as part of an individual-specific series of digital images of the absorbent article or the portion of the absorbent article as captured at a first time, recording, in the one or more memories and as part of the individual-specific series of digital images, a second image of a second absorbent article or a portion of a second absorbent article of the individual, the second image comprising a digital image as captured by a digital camera at a second time, and the second image comprising pixel data having a second biological feature as depicted within the second image of the second absorbent article or the portion of the second absorbent article, and generating, by the biological based learning model, the individual-specific biological prediction value based on the biological feature depicted within the pixel data of the digital image and further based on the second biological feature as depicted within the second image of the second absorbent article or the portion of the second absorbent article.

9. The biological digital imaging method of any one of aspects 1-8, wherein the one or more biological features comprises one or more of: a pixel color indicative of urine or a urine stain; or a pixel color indicative of a stool or a stool residue.

10. The biological digital imaging method of aspect any one of aspects 1-9, wherein the individual-specific biological prediction value indicates a probability of the individual experiencing a health issue.

11. The biological digital imaging method of any one of aspects 1-10 further comprises generating, based on the individual-specific biological prediction value, individual-specific recommendation designed to address the biological feature identifiable within the pixel data of the digital image of the absorbent article or the portion of the absorbent article.

12. The biological digital imaging method of aspect 11 further comprising render, on a display screen of a computing device, the individual-specific recommendation based on the biological feature identifiable within the pixel data of the digital image of the absorbent article or the portion of the absorbent article.

13. The biological digital imaging method of aspect 11 further comprising rendering, through a field of view or display screen of an augmented reality device, a virtual representation of the individual-specific recommendation based on the biological feature identifiable within the pixel data of the digital image of the absorbent article or the portion of the absorbent article, the virtual representation superimposed on one or more images of the absorbent article, portion of the absorbent article, or the individual associated with the absorbent article.

14. The digital imaging method of aspect 11, wherein the individual-specific recommendation comprises a textual recommendation, an imaged based recommendation, or a recommendation comprising a virtual rendering of at least the absorbent article, the portion of the absorbent article, or the individual associated with the absorbent article.

15. The digital imaging method of aspect 12, wherein the individual-specific recommendation is rendered on the display screen in real-time or near-real time, during, or after receiving, the digital image of the absorbent article or the portion of the absorbent article.

16. The biological digital imaging method of aspect 11, wherein the individual-specific recommendation is displayed on the display screen with instructions for treating the biological feature identifiable in the pixel data of the digital image of the absorbent article or the portion of the absorbent article.

17. The biological digital imaging method of aspect 11, wherein the individual-specific recommendation comprises a product recommendation for a manufactured product.

18. The biological digital imaging method of aspect 17, wherein the individual-specific recommendation is displayed on a display screen with instructions for treating, with the manufactured product, the biological feature as depicted within the digital image of the absorbent article or the portion of the absorbent article.

19. The biological digital imaging method of aspect 2, wherein the biological based learning model is further trained with product metrics of the absorbent articles or portions of absorbent articles as depicted in the plurality of training images or as provided as data input, and wherein the biological based learning model is further trained with reference data of one or more respective individuals corresponding to the absorbent articles or portions of absorbent articles as depicted in the plurality of training images, wherein the one or more biological features of the pixel data of the plurality of training images depicting the absorbent articles or the portions of absorbent articles comprise a positive attribute or a negative attribute corresponding to one or more of (1) the product metrics of the absorbent articles or portions of absorbent articles or (2) the reference data of one or more respective individuals, and wherein the biological digital imaging method further comprises: receiving product metric data of the absorbent article or the portion of the absorbent article of the individual, and receiving reference data of the individual, wherein the biological based learning model generates the individual-specific biological prediction value is based on the product metric data of the absorbent article or the portion of the absorbent article of the individual, the reference data of the individual, and the biological feature that comprises at least one of the positive attribute or the negative attribute corresponding to one or more the product metric data or the reference data of the individual.

20. The biological digital imaging method of aspect 1, wherein the biological feature identified in the pixel data comprises a stool or a stool residue, and wherein the individual-specific biological prediction value comprises at least one of: (1) a stool leakage score; (2) a stool normalcy score; (3) a stool color score; (4) a stool consistency score; (5) a stool and absorbent article product consistency score; (6) a stool amount score; or (7) a stool health score.

21. The biological digital imaging method of aspect 1, wherein the biological feature identified in the pixel data comprises urine or a urine stain, and wherein the individual-specific biological prediction value comprises at least one of: (1) a urine health score; (2) a urine color score; (3) a urine and absorbent article product color score; or (4) a urine leakage score.

22. A biological digital imaging method to provide an excrement-related analysis or prediction via the capture and analysis of at least a port ion of an image of a portion of a physical medium or an absorbent article containing excrement, wherein the method is performed alone or in conjunction with any one of aspects 1-21.

23. A biological digital imaging method to digitally analyze images of used physical mediums or absorbent articles, wherein the method is performed alone or in conjunction with any one of aspects 1-22.

24. The biological digital imaging method of any one of aspects 1-23, wherein analyzing the digital image of the absorbent article or the portion of the absorbent article to detect a biological feature comprises implementing object detection to detect one or more image objects within the pixel data of the digital image of the absorbent article or the portion of the absorbent article, and wherein the one or more objects comprise at least one of: (a) the absorbent article, or (b) a stain or color difference detected with the pixels of the absorbent article.

25. A biological digital imaging system claim configured to analyze pixel data of one or more digital images depicting absorbent articles or portions of absorbent articles, the biological digital imaging system comprising: one or more processors; and an imaging application (app) comprising computing instructions configured to execute on the one or more processors, wherein the computing instructions of the imaging app when executed by the one or more processors, cause the one or more processors to: obtain, at the one or more processors, a digital image depicting an absorbent article or a portion of an absorbent article, the digital image comprising pixel data, analyze, by the imaging application (app) executing on the one or more processors, the digital image of the absorbent article or the portion of the absorbent article to detect a biological feature depicted within the pixel data of the digital image of the absorbent article or the portion of the absorbent article, and generate, by the imaging app, an individual-specific biological prediction value corresponding to at least one of: (a) the absorbent article; (b) the portion of the absorbent article; or (c) an individual associated with the absorbent article or portion of the absorbent article, wherein the individual-specific biological prediction value is based on the biological feature depicted within the pixel data of the digital image of the absorbent article or the portion of the absorbent article.

26. A tangible, non-transitory computer-readable medium storing instructions for analyzing pixel data of one or more digital images depicting absorbent articles or portions of absorbent articles, that when executed by one or more processors cause the one or more processors to: obtain, at one or more processors, a digital image depicting an absorbent article or a portion of an absorbent article, the digital image comprising pixel data; analyze, by an imaging application (app) executing on the one or more processors, the digital image of the absorbent article or the portion of the absorbent article to detect a biological feature depicted within the pixel data of the digital image of the absorbent article or the portion of the absorbent article; and generate, by the imaging app, an individual-specific biological prediction value corresponding to at least one of: (a) the absorbent article; (b) the portion of the absorbent article; or (c) an individual associated with the absorbent article or portion of the absorbent article, wherein the individual-specific biological prediction value is based on the biological feature depicted within the pixel data of the digital image of the absorbent article or the portion of the absorbent article.

ADDITIONAL CONSIDERATIONS

Although the disclosure herein sets forth a detailed description of numerous different aspects, it should be understood that the legal scope of the description is defined by the words of the claims set forth at the end of this patent and equivalents. The detailed description is to be construed as exemplary only and does not describe every possible aspect since describing every possible aspect would be impractical. Numerous alternative aspects may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other aspects, the one or more processors or processor-implemented modules may be distributed across a number of geographic locations.

This detailed description is to be construed as exemplary only and does not describe every possible aspect, as describing every possible aspect would be impractical, if not impossible. A person of ordinary skill in the art may implement numerous alternate aspects, using either current technology or technology developed after the filing date of this application.

Those of ordinary skill in the art will recognize that a wide variety of modifications, alterations, and combinations can be made with respect to the above described aspects without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A biological digital imaging method for analyzing pixel data of one or more digital images depicting absorbent articles or portions of absorbent articles, the biological digital imaging method comprising:

obtaining, at one or more processors, a digital image depicting an absorbent article or a portion of an absorbent article, the digital image comprising pixel data;

analyzing, by an imaging application (app) executing on the one or more processors and by inputting the digital image into a biological based learning model electronically accessible by the imaging app, wherein the biological based learning model is trained with pixel data of a plurality of training images depicting absorbent articles or portions of absorbent articles having respective biological features depicted within the pixel data of respective training images, the biological based learning model configured to output one or more biological prediction values corresponding to one or more biological features of the pixel data of the plurality of training images depicting the absorbent articles or the portions of absorbent articles, the digital image of the absorbent article or the portion of the absorbent article to detect a biological feature depicted within the pixel data of the digital image of the absorbent article or the portion of the absorbent article; and generating, by the imaging app, an individual-specific biological prediction value corresponding to at least one of: (a) the absorbent article; (b) the portion of the absorbent article; or (c) an individual associated with the absorbent article or portion of the absorbent article, wherein the biological based learning model is configured to automatically segment a region of interest of the digital image comprising the biological feature for biological analysis based on the pixel data of the digital image; and wherein the individual-specific biological prediction value is based on the biological feature depicted within the pixel data of the digital image of the absorbent article or the portion of the absorbent article; and wherein the biological feature identified in the pixel data comprises a stool or a stool residue, and wherein the individual-specific biological prediction value comprises at least one of: (1) a stool leakage score; (2) a stool normalcy score; (3) a stool color score; (4) a stool consistency score; (5) a stool and absorbent article product consistency score; (6) a stool amount score; or (7) a stool health score.

2. The biological digital imaging method of claim 1, wherein the plurality of training images depicting absorbent articles or portions of absorbent articles comprises digital images of absorbent articles or portions of absorbent articles as captured and submitted by different individuals.

3. The biological digital imaging method of claim 1, wherein the plurality of training images depicting absorbent articles or portions of absorbent articles comprises simulated images of absorbent articles or portions of absorbent articles.

4. The biological digital imaging method of claim 1, wherein the plurality of training images depicting absorbent articles or portions of absorbent articles comprises digital images depicting different sizes or types of absorbent articles.

5. The biological digital imaging method of claim 1, wherein the plurality of training images depicting absorbent articles or portions of absorbent articles comprises one or more sets of series of digital images, each series of digital images depicting a series of digital images of absorbent articles or portions of absorbent articles of respective individuals over respective periods of time.

6. The biological digital imaging method of claim 5, further comprising:

recording, in one or more memories communicatively coupled to the one or more processors, the digital image of the absorbent article or the portion of the absorbent article as part of an individual-specific series of digital images of the absorbent article or the portion of the absorbent article as captured at a first time, recording, in the one or more memories and as part of the individual-specific series of digital images, a second image of a second absorbent article or a portion of a second absorbent article of the individual, the second image comprising a digital image as captured by a digital camera at a second time, and the second image comprising pixel data having a second biological feature as depicted within the second image of the second absorbent article or the portion of the second absorbent article, and generating, by the biological based learning model, the individual-specific biological prediction value based on the biological feature depicted within the pixel data of the digital image and further based on the second biological feature as depicted within the second image of the second absorbent article or the portion of the second absorbent article.

7. The biological digital imaging method of claim 1, wherein the one or more biological features comprises one or more of: a pixel color indicative of urine or a urine stain; or a pixel color indicative of a stool or a stool residue.

8. The biological digital imaging method of claim 1, wherein the individual-specific biological prediction value indicates a probability of the individual experiencing a health issue.

9. The biological digital imaging method of claim 1 further comprises generating, based on the individual-specific biological prediction value, individual-specific recommendation designed to address the biological feature identifiable within the pixel data of the digital image of the absorbent article or the portion of the absorbent article.

10. The biological digital imaging method of claim 9 further comprising render, on a display screen of a computing device, the individual-specific recommendation based on the biological feature identifiable within the pixel data of the digital image of the absorbent article or the portion of the absorbent article.

11. The biological digital imaging method of claim 9 further comprising rendering, through a field of view or display screen of an augmented reality device, a virtual representation of the individual-specific recommendation based on the biological feature identifiable within the pixel data of the digital image of the absorbent article or the portion of the absorbent article, the virtual representation superimposed on one or more images of the absorbent article, portion of the absorbent article, or the individual associated with the absorbent article.

12. The digital imaging method of claim 9, wherein the individual-specific recommendation comprises a textual recommendation, an imaged based recommendation, or a recommendation comprising a virtual rendering of at least the absorbent article, the portion of the absorbent article, or the individual associated with the absorbent article.

13. The digital imaging method of claim 10, wherein the individual-specific recommendation is rendered on the display screen in real-time or near-real time, during, or after receiving, the digital image of the absorbent article or the portion of the absorbent article.

14. The biological digital imaging method of claim 10, wherein the individual-specific recommendation is displayed on the display screen with instructions for treating the biological feature identifiable in the pixel data of the digital image of the absorbent article or the portion of the absorbent article.

15. The biological digital imaging method of claim 9, wherein the individual-specific recommendation comprises a product recommendation for a manufactured product.

16. The biological digital imaging method of claim 15, wherein the individual-specific recommendation is displayed on a display screen with instructions for treating, with the manufactured product, the biological feature as depicted within the digital image of the absorbent article or the portion of the absorbent article.

17. The biological digital imaging method of claim 1, wherein the biological based learning model is further trained with product metrics of the absorbent articles or portions of absorbent articles as depicted in the plurality of training images or as provided as data input, and wherein the biological based learning model is further trained with reference data of one or more respective individuals corresponding to the absorbent articles or portions of absorbent articles as depicted in the plurality of training images, wherein the one or more biological features of the pixel data of the plurality of training images depicting the absorbent articles or the portions of absorbent articles comprise a positive attribute or a negative attribute corresponding to one or more of (1) the product metrics of the absorbent articles or portions of absorbent articles, or (2) the reference data of one or more respective individuals, and wherein the biological digital imaging method further comprises:

receiving product metric data of the absorbent article or the portion of the absorbent article of the individual, and receiving reference data of the individual, wherein the biological based learning model generates the individual-specific biological prediction value is based on the product metric data of the absorbent article or the portion of the absorbent article of the individual, the reference data of the individual, and the biological feature that comprises at least one of the positive attribute or the negative attribute corresponding to one or more the product metric data or the reference data of the individual.

18. The biological digital imaging method of claim 1, wherein analyzing the digital image of the absorbent article or the portion of the absorbent article to detect a biological feature comprises implementing object detection to detect one or more image objects within the pixel data of the digital image of the absorbent article or the portion of the absorbent article, and wherein the one or more objects comprise at least one of: (a) the absorbent article, or (b) a stain or color difference detected with the pixels of the absorbent article.

19. A biological digital imaging system configured to analyze pixel data of one or more digital images depicting absorbent articles or portions of absorbent articles, the biological digital imaging system comprising:

one or more processors; and an imaging application (app) comprising computing instructions configured to execute on the one or more processors, wherein the computing instructions of the imaging app when executed by the one or more processors, cause the one or more processors to:

obtain, at the one or more processors, a digital image depicting an absorbent article or a portion of an absorbent article, the digital image comprising pixel data, analyze, by the imaging application (app) executing on the one or more processors, the digital image of the absorbent article or the portion of the absorbent article to detect a biological feature depicted within the pixel data of the digital image of the absorbent article or the portion of the absorbent article; wherein the analyzing of the digital image comprises inputting the digital image into a biological based learning model electronically accessible by the imaging app; wherein biological based learning model is trained with pixel data of a plurality of training images depicting absorbent articles or portions of absorbent articles having respective biological features depicted within the pixel data of respective training images, the biological based learning model configured to output one or more biological prediction values corresponding to one or more biological features of the pixel data of the plurality of training images depicting the absorbent articles or the portions of absorbent articles; and wherein the biological based learning model is configured to automatically segment a region of interest of the digital image comprising the biological feature for biological analysis based on the pixel data of the digital image, and generate, by the imaging app, an individual-specific biological prediction value corresponding to at least one of: (a) the absorbent article; (b) the portion of the absorbent article; or (c) an individual associated with the absorbent article or portion of the absorbent article, wherein the individual-specific biological prediction value is based on the biological feature depicted within the pixel data of the digital image of the absorbent article or the portion of the absorbent article, and wherein the biological feature identified in the pixel data comprises a stool or a stool residue.

* * * * *